US012756941B2

(12) United States Patent
Yata

(10) Patent No.: US 12,756,941 B2
(45) Date of Patent: Oct. 6, 2026

(54) IMAGE SENSING DEVICE, IMAGE PROCESSING DEVICE, AND IMAGING DEVICE INCLUDING THE IMAGE SENSING DEVICE AND THE IMAGE PROCESSING DEVICE

(71) Applicant: SK hynix Inc., Gyeonggi-do (KR)

(72) Inventor: Yusuke Yata, Tokyo (JP)

(73) Assignee: SK hynix Inc., Gyeonggi-do (KR)

(*) Notice: Subject to any disclaimer, the term of this patent is extended or adjusted under 35 U.S.C. 154(b) by 135 days.

(21) Appl. No.: 18/809,333

(22) Filed: Aug. 20, 2024

(65) Prior Publication Data

US 2025/0088756 A1 Mar. 13, 2025

(30) Foreign Application Priority Data

Sep. 8, 2023 (KR) ........................ 10-2023-0119738

(51) Int. Cl.
*H04N 23/76* (2023.01)
*G01S 17/36* (2006.01)
*H04N 25/703* (2023.01)

(52) U.S. Cl.
CPC ............. *H04N 23/76* (2023.01); *G01S 17/36* (2013.01); *H04N 25/703* (2023.01)

(58) Field of Classification Search
CPC .... H04N 23/76; H04N 25/703; H04N 25/705; H04N 25/533; H04N 25/78; G01S 17/36; G01S 17/894; G01S 17/10
See application file for complete search history.

(56) References Cited

U.S. PATENT DOCUMENTS

| | | | | |
|---|---|---|---|---|
| 7,791,715 | B1 | 9/2010 | Bamji | |
| 9,062,969 | B1 | 6/2015 | Degges, Jr. et al. | |
| 2017/0041589 | A1* | 2/2017 | Patil | G01S 17/894 |
| 2020/0349728 | A1* | 11/2020 | Bitan | H04N 5/2226 |
| 2023/0072110 | A1* | 3/2023 | Class | G01S 7/4914 |

FOREIGN PATENT DOCUMENTS

JP 2022-109077 A 7/2022

* cited by examiner

*Primary Examiner* — Mekonnen D Dagnew

(74) *Attorney, Agent, or Firm* — IP&T GROUP LLP

(57) ABSTRACT

An image sensing device includes a phase difference calculator configured to calculate a phase difference between a modulated light signal and reflected light based on a plurality of captured data generated by a plurality of modulation control signals, each of which has a predetermined modulation phase difference with respect to the modulated light signal; a phase difference corrector configured to calculate a contrast, which is a ratio of an amplitude component of the reflected light to an intensity component of the reflected light, using the plurality of captured data, and determine an aliasing value corresponding to the contrast; and a distance calculator configured to calculate a distance to a target object using a corrected phase difference obtained by correcting the phase difference according to the aliasing value.

19 Claims, 12 Drawing Sheets

IMAGE SENSING DEVICE, IMAGE PROCESSING DEVICE, AND IMAGING DEVICE INCLUDING THE IMAGE SENSING DEVICE AND THE IMAGE PROCESSING DEVICE

CROSS-REFERENCE TO RELATED APPLICATION

This patent application claims the priority and benefits of Korean patent application No. 10-2023-0119738, filed on Sep. 8, 2023, the disclosure of which is incorporated herein by reference in its entirety.

TECHNICAL FIELD

The technology and embodiments of the present disclosure generally relate to an image sensing device capable of detecting a distance to a target object, an image processing device, and an imaging device including the image sensing device and the image processing device.

BACKGROUND

An image sensing device is a device for capturing optical images by converting light into electrical signals using a photosensitive semiconductor material which reacts to light. With the development of automotive, medical, computer and communication industries, the demand for high-performance image sensing devices is increasing in various devices such as smart phones, wearable devices, digital cameras, game machines, IOT (Internet of Things), robots, security cameras and medical micro-cameras.

Recently, image sensing devices have been actively used not only to acquire color images but also to sense the distance to a target object to be captured. In particular, a time of flight (ToF) method, which directly or indirectly measures a time duration in which light is reflected from the target object and returns to the image sensing device, has been widely used.

SUMMARY

Various embodiments of the present disclosure relate to an image sensing device capable of increasing the accuracy of distance measurement, an image processing device, and an imaging device including the image sensing device and the image processing device.

In accordance with an embodiment of the present disclosure, an image sensing device may include a phase difference calculator configured to calculate a phase difference between a modulated light signal and reflected light based on a plurality of captured data generated by a plurality of modulation control signals, each of which has a predetermined modulation phase difference with respect to the modulated light signal; a phase difference corrector configured to calculate a contrast, which is a ratio of an amplitude component of the reflected light to an intensity component of the reflected light, using the plurality of captured data, and determine an aliasing value corresponding to the contrast; and a distance calculator configured to calculate a distance to a target object using a corrected phase difference obtained by correcting the phase difference according to the aliasing value.

In accordance with another embodiment of the present disclosure, an imaging device may include an image sensing device configured to generate a plurality of captured data using a plurality of modulation control signals each having a predetermined modulation phase difference with respect to a modulated light signal; and an image processing device configured to calculate a contrast, which is a ratio of an amplitude component of reflected light to an intensity component of reflected light, using the plurality of capture data, and calculate a distance to a target object using a correction phase difference obtained by correcting a phase difference between the modulated light signal and the reflected light according to an aliasing value corresponding to the contrast.

In accordance with another embodiment of the present disclosure, an image sensing device may include a pixel configured to generate a plurality of pixel signals by sensing reflected light using a plurality of modulation control signals each having a predetermined modulation phase difference with respect to a modulated light signal; and a readout circuit configured to generate a plurality of capture data by processing the pixel signals, wherein an exposure period in which the pixel senses the reflected light includes a first section in which the plurality of modulation control signals maintains a logic high level, and a second section in which the plurality of modulation control signals alternately has the logic high level.

It is to be understood that both the foregoing general description and the following detailed description of the disclosed technology are illustrative and descriptive and are intended to provide further description of the embodiments of the present disclosure as claimed.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
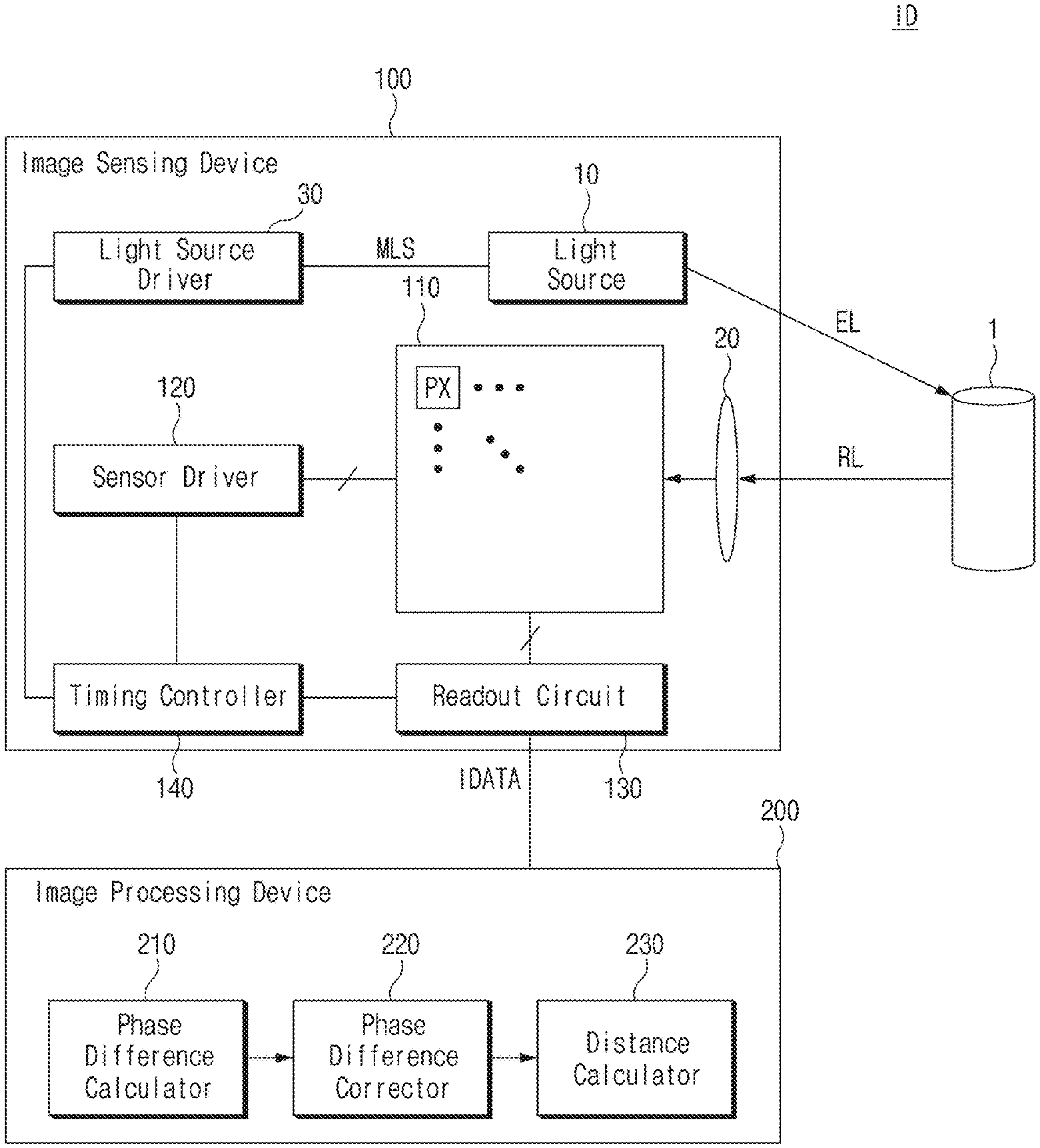
FIG. 1 is a block diagram illustrating an imaging device based on some embodiments of the present disclosure.

The present disclosure provides embodiments and examples of an image sensing device capable of detecting a distance to a target object, an image processing device, and an imaging device including the image sensing device and the image processing device, that may be used in configurations to substantially address one or more technical or engineering issues and to mitigate limitations or disadvantages encountered in some other image sensing devices. Some embodiments of the present disclosure relate to an image sensing device capable of increasing the accuracy of distance measurement, an image processing device, and an imaging device including the same. The present disclosure provides various embodiments of the image sensing device that can more accurately obtain the distance to a target object to be captured by correcting a phase difference calculated by the time of flight (ToF) method.

Reference will now be made in detail to the embodiments of the present disclosure, which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the present disclosure should not be construed as being limited to the embodiments set forth herein.

Hereinafter, various embodiments will be described with reference to the accompanying drawings. However, it should be understood that the disclosed technology is not limited to specific embodiments, but includes various modifications, equivalents and/or alternatives of the embodiments. The embodiments of the present disclosure may provide a variety of effects capable of being directly or indirectly recognized through the disclosed technology.

FIG. 1 is a block diagram illustrating an imaging device ID based on some embodiments of the present disclosure.

Referring to FIG. 1, the imaging device (ID) may refer to a device, for example, a digital still camera for photographing still images or a digital video camera for photographing moving images. For example, the imaging device (ID) may be implemented as a Digital Single Lens Reflex (DSLR) camera, a mirrorless camera, a smartphone, and the like. The imaging device (ID) may include a device having both a lens and an image pickup element such that the device can capture (or photograph) a target object and can thus create an image of the target object. In some embodiments, the imaging device (ID) may be implemented as a Lidar sensor.

The imaging device (ID) may include an image sensing device 100 and an image processing device 200.

The image sensing device 100 may be a complementary metal oxide semiconductor image sensor (CIS) for converting an incident light into an electrical signal. The image sensing device 100 may include a light source 10, a lens module 20, a light source driver 30, a pixel array 110, a sensor driver 120, a readout circuit 130, and a timing controller 140.

The light source 10 may emit light to a target object 1 upon receiving a modulated light signal (MLS) from the light source driver 30. The light source 10 may be a laser diode (LD) or a light emitting diode (LED) for emitting light (e.g., near infrared (NIR) light, infrared (IR) light or visible light) having a specific wavelength band, or may be any of a Near Infrared Laser (NIR), a point light source, a monochromatic light source combined with a white lamp or a monochromator, and a combination of other laser sources. For example, the light source 10 may be implemented as light (hereinafter referred to as "infrared light") of an infrared band having a wavelength of 800 nm to 1000 nm, and the light source 10 of the disclosed technology may emit infrared light having a wavelength of 800 nm to 1000 nm. The light emitted from the light source 10 may be pulsed light having a predetermined period, amplitude, and pulse width. Although FIG. 1 shows only one light source 10 for convenience of description, the scope or spirit of the present disclosure is not limited thereto, and a plurality of light sources may also be arranged in the vicinity of the lens module 20.

The lens module 20 may collect light reflected from the target object 1, and may allow the collected light to be focused onto pixels (PXs) of the pixel array 110. For example, the lens module 20 may include a focusing lens having a surface formed of glass or plastic or another cylindrical optical element having a surface formed of glass or plastic. The lens module 20 may include a plurality of lenses that are arranged to be focused upon an optical axis.

The light source driver 30 may drive the light source 10 under control of the timing controller 140. In particular, the light source driver 30 may control waveforms (e.g., a frequency, period, amplitude, pulse width, etc.) of an emitted light (EL) output from the light source 10 using the modulated light signal (MLS).

The pixel array 110 may include a plurality of pixels (PXs) consecutively arranged in a two-dimensional (2D) matrix structure (e.g., consecutively arranged in a column direction and/or a row direction). Each of the plurality of pixels (PXs) may generate a pixel signal by sensing the incident light incident through the lens module 20 under control of the sensor driver 120.

Each pixel (PX) may be an infrared pixel for generating a pixel signal by sensing the incident light that includes a reflected light (RL) generated when the emitted light (EL) from the light source 10 is reflected from the target object 1. According to one embodiment, the infrared pixel may be a depth pixel for calculating the distance to the target object 1. According to another embodiment, the infrared pixel may include a pixel for generating an infrared image by simply sensing infrared light incident from a scene without sensing the reflected light. According to still another embodiment, the pixels (PXs) may include a pixel for generating a color image by sensing visible light incident from a scene. Hereinafter, description will be given that each pixel (PX) is a two-tap (2-tap) pixel for detecting the distance to the target object 1 according to an indirect time-of-flight (ToF) method. A more detailed structure and operations of each unit pixel (PX) will hereinafter be described with reference to the drawings from FIG. 2.

The sensor driver 120 may drive the pixels (PXs) of the pixel array 110 in response to a timing signal output from the timing controller 140. For example, the sensor driver 120 may generate a control signal capable of selecting and controlling pixels (PXs) included in at least one row line from among a plurality of row lines of the pixel array 110.

The readout circuit 130 may process pixel signals received from the pixel array 110 under control of the timing controller 140, and may generate and store image data (IDATA) for detecting the distance to the target object 1. Image data (IDATA) may be digital data obtained by analog-to-digital conversion (ADC) of an analog pixel signal. To this end, the readout circuit 130 may include a correlated double sampler (CDS) circuit for performing correlated double sampling (CDS) on the pixel signals generated from the pixel array 110. In addition, the readout circuit 130 may include an analog-to-digital converter (ADC) for converting output signals of the CDS circuit into digital signals. In addition, the readout circuit 130 may include a buffer circuit that temporarily stores pixel data generated from the analog-to-digital converter (ADC) and outputs the pixel data under control of the timing controller 140. Additionally, two column lines for transmitting the pixel signal may be assigned to each column of the pixel array 110, and structures for processing the pixel signal generated from each column line may be configured to correspond to the respective column lines.

The timing controller 140 may generate a timing signal to control the light source driver 30, the sensor driver 120, and the readout circuit 130. In some embodiments, the timing controller 140 may generate a timing signal according to either a predetermined value or a request received from the image processing device 200. In some embodiments, the timing controller 140 may include a logic control circuit, a phase lock loop (PLL) circuit, a timing control circuit, a communication interface circuit and others.

The image processing device 200 may perform at least one image signal process on image data (IDATA) received from the image sensing device 100, and may thus generate the processed image data. The image processing device 200 may reduce noise of image data (IDATA), and may perform various types of image signal processing (e.g., interpolation of image data (IDATA), lens distortion correction, etc.) for image-quality improvement of the image data.

The image processing device 200 may include a phase difference calculator 210, a phase difference corrector 220, and a distance calculator 230. The image processing device 200 may be implemented with hardware, software, or a combination thereof.

The phase difference calculator 210 may calculate a phase difference between the emitted light (EL) and the reflected light (RL) based on the image data (IDATA). There is a time delay between the emitted light (EL) and the reflected light (RL) depending on the distance between the image sensing device 100 and the target object 1, and the time delay may appear as a phase difference between the emitted light (EL) and the reflected light (RL). In some embodiments, there is no time delay between the modulated light signal (MLS) and the emitted light (EL). That is, the phase difference between the emitted light (EL) and the reflected light (RL) may be the same as a phase difference between the modulated light signal (MLS) and the reflected light (RL).

The phase difference corrector 220 may correct a phase difference using image data (IDATA). The emitted light (EL) may be modulated at a certain frequency so that the emitted light (EL) may have periodicity. Due to such periodicity, image data obtained by detecting the target object 1 located at different distances from the image sensing device 100 may represent the same phase difference. The phase difference corrector 220 may generate a corrected phase difference by correcting the phase difference so that the phase difference indicates the distance to the target object 1.

In addition, the phase difference corrector 220 may correct the phase difference by removing ambient light components as much as possible in order to prevent the effect of phase difference correction from being degraded due to the ambient light components.

The distance calculator 230 may calculate the distance to the target object 1 using the corrected phase difference. The distance to the target object 1 may be calculated for each pixel of the pixel array 110.

In the following description, the process in which the image processing device 200 calculates the distance to the target object 1 based on one pixel will be described with reference to the drawings, but substantially the same method as described above can also be applied to other pixels of the pixel array 110.

Figure 2:
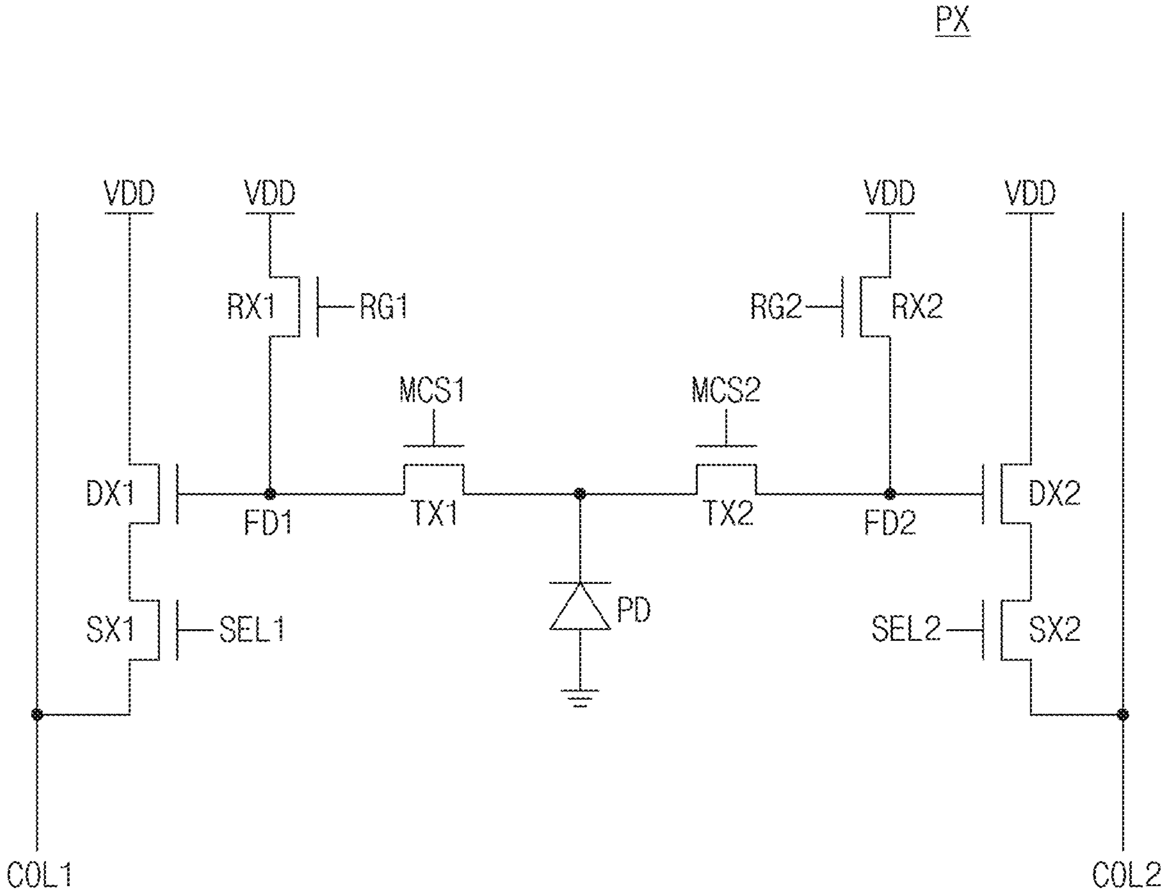
FIG. 2 is a circuit diagram illustrating a pixel included in the pixel array of FIG. 1 based on some embodiments of the present disclosure.

FIG. 2 is a circuit diagram illustrating a pixel included in the pixel array 110 of FIG. 1 based on some embodiments of the present disclosure.

Referring to FIG. 2, the pixel (PX) may correspond to one example of each pixel (PX) included in the pixel array 110.

The pixel (PX) may include a photoelectric conversion element (PD), first and second transfer transistors (TX1, TX2), first and second reset transistors (RX1, RX2), and first and second drive transistors (DX1, DX2), and first and second selection transistors (SX1, SX2).

The pixel (PX) may be a 2-tap pixel that includes a first tap driven based on a first modulation control signal (MCS1) having a predetermined modulation phase difference with the modulated light signal (MLS), and a second tap driven based on a second modulation control signal (MCS2) having a phase opposite to that of the first modulation control signal (MCS1). The first tap may include a first transfer transistor (TX1), a first reset transistor (RX1), a first drive transistor (DX1), and a first selection transistor (SX1). In addition, the second tap may include a second transfer transistor (TX2), a second reset transistor (RX2), a second drive transistor (DX2), and a second selection transistor (SX2). In some embodiments, a modulation phase difference may refer to a phase difference between the modulated light signal (MLS) and the modulation control signals (MCS1, MCS2), and a phase difference may refer to a phase difference between the modulated light signal (MLS) and the reflected light (RL).

Each of the modulation control signals (MCS1, MCS2) may have a predetermined modulation phase difference (e.g., any of 0 degrees, 90 degrees, 180 degrees, or 270 degrees) with the modulated light signal (MLS).

The photoelectric conversion element (PD) may generate and accumulate photocharges corresponding to the intensity of the incident light through photoelectric conversion of the incident light. For example, the photoelectric conversion element (PD) may be implemented as at least one of a photodiode, a pinned photodiode, and a phototransistor, but the scope of the present disclosure is not limited thereto.

First, the structure and operation of the first tap will hereinafter be described with reference to the attached drawings. The first transfer transistor (TX1) may be connected between the photoelectric conversion element (PD) and the first floating diffusion region (FD1), and may be turned on or off in response to the first modulation control signal (MCS1). The turned-on first transfer transistor TX1 may transmit photocharges accumulated in the photoelectric conversion element (PD) to the first floating diffusion region (FD1). The first floating diffusion region (FD1) may have capacitance sufficient to accumulate photocharges generated by the photoelectric conversion element (PD), and may be implemented as a junction capacitor, but the scope of the present disclosure is not limited thereto.

The first reset transistor (RX1) may be connected between a power-supply voltage (VDD) and a first floating diffusion region FD1, and may be turned on or off in response to a first reset control signal (RG1). The turned-on first reset transistor (RX1) may drain photocharges accumulated in the first floating diffusion region (FD1) by resetting the first floating diffusion region (FD1) to the power-supply voltage (VDD).

The first drive transistor (DX1) may be connected between the power-supply voltage (VDD) and the first selection transistor (SX1), and may generate an electrical signal corresponding to a voltage of the first floating diffusion region (FD1).

The first selection transistor (SX1) may be connected between the first drive transistor (DX1) and a first column line (COL1), and may be turned on or off in response to a first selection control signal (SEL1). The turned-on first selection transistor (SX1) may output the electrical signal output from the first drive transistor (DX1) through the first column line (COL1).

Control signals (MCS1, RG1, SEL1) for controlling the first tap may be provided from the sensor driver 120 shown in FIG. 1.

Although the structure and operation of the first tap have been described above, the structure and operation of the second tap may also be substantially the same as those of the first tap, and as such redundant description thereof will herein be omitted for brevity. However, waveforms of the control signals (MCS2, RG2, SEL2) for controlling the second tap may be different from waveforms of the control signals (MCS1, RG1, SEL1) for controlling the first tap. In particular, the second modulation control signal (MCS2) may have a phase opposite to that of the first modulation control signal (MCS1).

Figure 3:
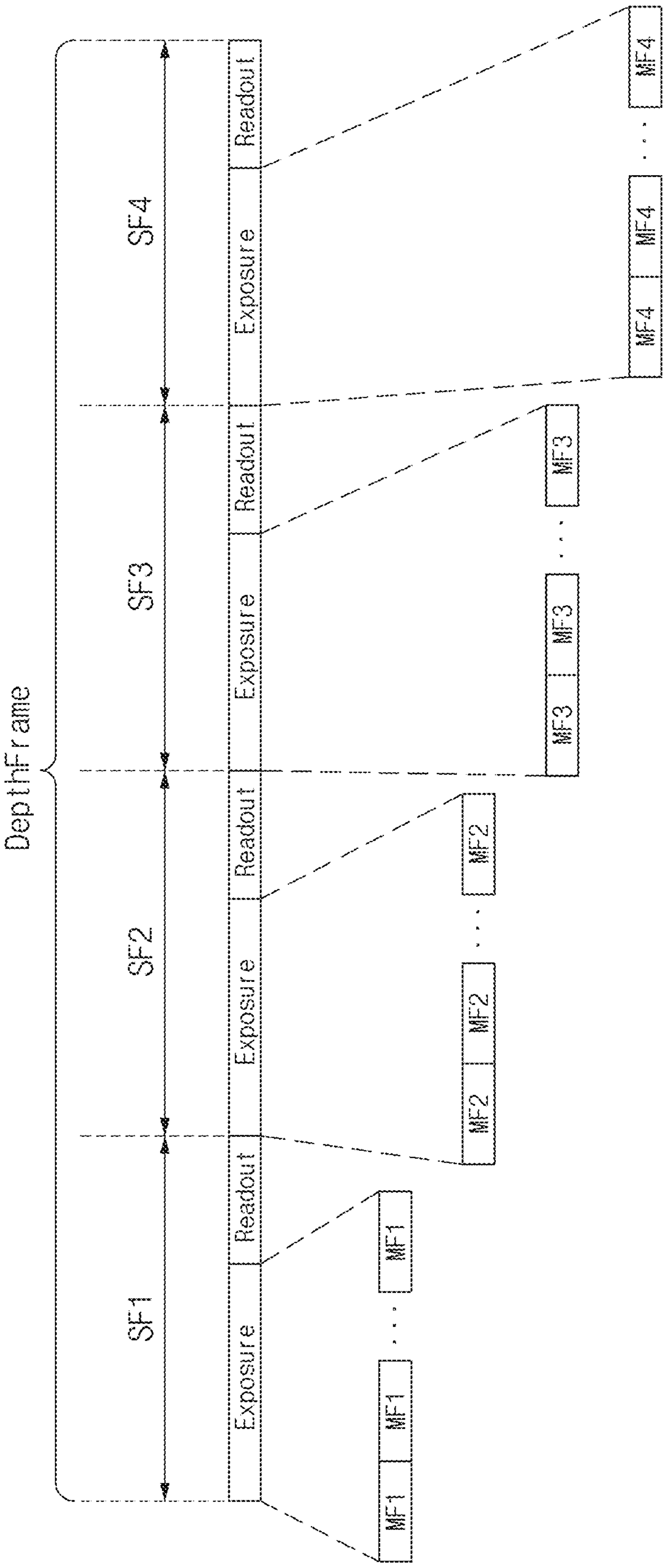
FIG. 3 is a schematic diagram illustrating a structure of a depth frame capable of acquiring depth data based on some embodiments of the present disclosure.

FIG. 3 is a schematic diagram illustrating a structure of a depth frame capable of acquiring depth data based on some embodiments of the present disclosure.

Referring to FIG. 3, the image sensing device 100 may operate in units of depth frames to acquire depth data indicating the distance to the target object 1. That is, the image sensing device 100 may acquire depth data after performing an operation corresponding to a depth frame.

The depth frame may include first to fourth subframes (SF1~SF4). The first modulation control signal (MCS1) may have different phases in the first to fourth subframes (SF1~SF4). In addition, the second modulation control signal (MCS2) having a phase opposite to that of the first modulation control signal (MCS1) may also have different phases in the first to fourth subframes (SF1~SF4).

Each of the first to fourth subframes (SF1~SF4) may include an exposure period and a readout period.

The exposure period may refer to a time period in which photocharges are generated by the pixel (PX) that senses the reflected light (RL) obtained when the emitted light (EL) output from the image sensing device 100 according to the modulated light signal (MLS) is reflected from the target object 1 and the generated photocharges are accumulated in components (e.g., FD1, FD2) located inside the pixel (PX).

The exposure period may include at least one microframe. A microframe may be a unit that constitutes an exposure period, and a more detailed description of the microframe will be given later with reference to FIGS. 4A to 4D.

An exposure period may include a plurality of microframes to secure a sufficient amount of light, and the number of microframes included in one exposure period may be experimentally predetermined. In some other embodiments, the number of microframes included in one exposure period may vary depending on illumination conditions.

The exposure period of the first subframe (SF1) may include a plurality of consecutive first microframes (MF1), and the exposure period of the second subframe (SF2) may include a plurality of consecutive second microframes (MF2). In addition, the exposure period of the third subframe (SF3) may include a plurality of consecutive third microframes (MF3), and the exposure period of the fourth subframe (SF4) may include a plurality of consecutive fourth microframes (MF4).

The readout period may refer to a time period in which the readout circuit 130 generates image data (IDATA) based on an electrical signal corresponding to the photocharges accumulated in the pixel (PX) and transmits the image data (IDATA) to the image processing device 200.

Figure 4A:
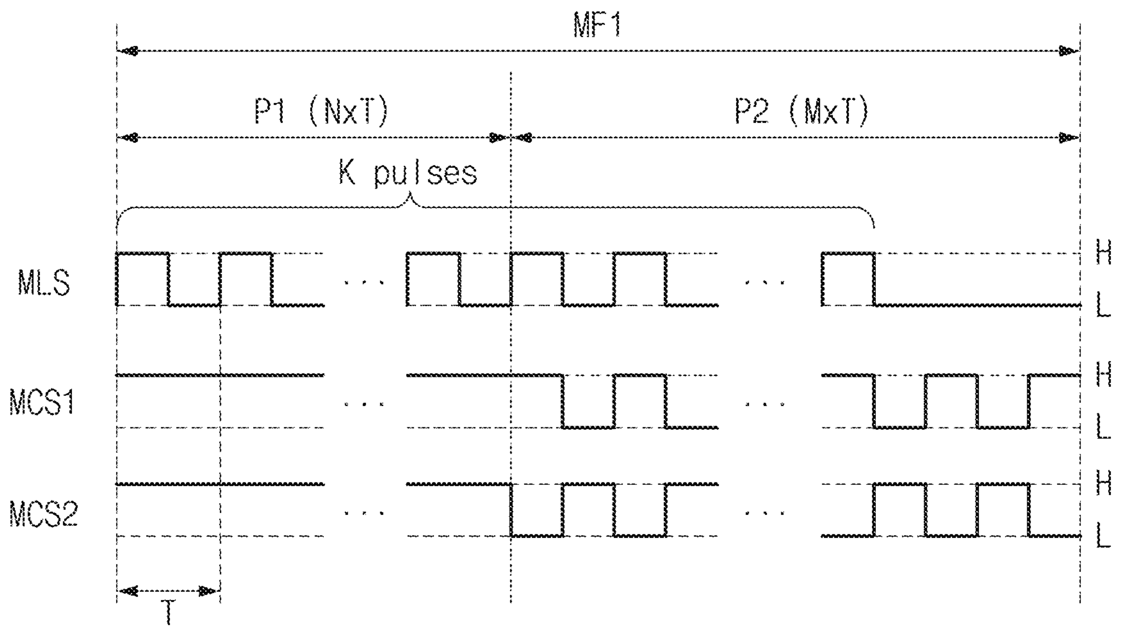
FIG. 4A is a timing diagram illustrating a modulated light signal and modulation control signals for use in a first microframe based on some embodiments of the present disclosure.

FIG. 4A is a timing diagram illustrating a modulated light signal and modulation control signals for use in a first microframe (MF1) based on some embodiments of the present disclosure.

Referring to FIG. 4A, the first microframe (MF1) constituting the exposure period of the first subframe (SF1) of FIG. 3 may include a first section P1 and a second section P2.

In the first microframe (MF1), the modulated light signal (MLS) may be a square-wave signal alternately having a logic high level (H) and a logic low level (L). The light source 10 may output the emitted light (EL) in response to the modulated light signal (MLS) of a logic high level (H), and may not output the emitted light (EL) in response to the modulated light signal (MLS) of a logic low level (L). Accordingly, waveforms of the emitted light EL may be the same as those of the modulated light signal (MLS). In the following description, modulated light signal (MLS) and the emitted light (EL) may be used interchangeably.

The modulated light signal (MLS) may have a predetermined modulation frequency (F) and a period (T) corresponding to 1/F. As the pulse of the modulated light signal (MLS) has periodicity indicating that the modulated light signal (MLS) is repeated every period (T), a phase difference between the modulated light signal (MLS) and the reflected light (RL) may also have periodicity. In the indirect TOF method, the distance to the target object 1 may be estimated based on the phase difference between the modulated light signal (MLS) and the reflected light (RL). Even when the distance to the target object 1 is different, the same phase difference may appear due to such periodicity of the phase difference.

A maximum measurement distance ($D_{freq}$) depending on the modulation frequency (F) of the modulated light signal (MLS) can be calculated by Equation 1 below.

$$D_{freq} = \frac{c}{2} \cdot \frac{1}{F} \quad \text{[Equation 1]}$$

In Equation 1, 'c' may mean the speed of light (luminous flux).

For example, when the modulation frequency (F) of the modulated light signal (MLS) is 100 MHZ, the period (T) of the modulated light signal (MLS) may be 10 ns. In this case, a maximum measurement distance ($D_{freq}$) depending on the modulation frequency (F) may be 1.5 m. That is, a first phase difference corresponding to an example case in which the distance to the target object 1 is 0.1 m may be identical to a second phase difference corresponding to an example case in which the distance to the target object 1 is 1.6 m, and it may be impossible to distinguish the first phase difference and the second phase difference from each other. The above-described phenomenon may be defined as 'aliasing'. In some embodiments, such aliasing can be overcome by using contrast of image data (IDATA). A more detailed description of the aliasing operation will be given later with reference to FIGS. 5 and 6. The period (T) may refer to a time period in which pulses are repeated, and may also be referred to as a pulse period.

The first section P1 of the first microframe (MF1) may have a length of (N×T) (where N is an integer of 1 or greater). In the first section P1 of the first microframe (MF1), the first modulation control signal (MCS1) and the second modulation control signal (MCS2) may be kept at a logic high level (H). The first transfer transistor (TX1) that receives the first modulation control signal (MCS1) of a logic high level and the second transfer transistor (TX2) that receives the second modulation control signal (MCS2) of a logic high level may be turned on. Photocharges generated in the first section P1 may be equally distributed to and accumulated in a first tap and a second tap. Here, N may be a value that satisfies a condition of Equation 2 below.

$$N \geq \mathrm{Ceil}\left(\frac{D_{max}}{D_{freq}}\right) \quad \text{[Equation 2]}$$

In Equation 2, a target measurement distance ($D_{max}$) may refer to a maximum measurement distance to be measured by the imaging device (ID) without aliasing. That is, N may be an integer greater than or equal to a ceiling value obtained by dividing a target measurement distance ($D_{max}$) by a maximum measurement distance ($D_{freq}$).

For example, when a distance of up to 6 meters is to be measured without aliasing by using the modulated light signal (MLS) having a modulation frequency of 100 MHZ, N may be an integer equal to or greater than 6/(1.5)=4.

In addition, the number (K) of pulses of the modulated light signal (MLS) may be an integer equal to or greater than (N+1) such that a phase difference between the modulated light signal (MLS) and the reflected light (RL) can be normally detected even when the distance to the target object 1 is relatively short.

The second section P2 of the first microframe (MF1) may have a length of (M×T), where M is an integer of 1 or greater. In the second section P2 of the first microframe (MF1), the first modulation control signal (MCS1) may have the same phase as the modulated light signal (MLS), and the second modulation control signal (MCS2) may have a modulation phase difference of 180 degrees (i.e., an opposite phase) with respect to the phase of the modulated light signal (MLS). Accordingly, the photocharges generated in the second section P2 may be distributed to and accumulated in the first tap and the second tap at a preset ratio according to a time delay between the modulated light signal (MLS) and the reflected light (RL).

Here, M may be a value that satisfies a condition of Equation 3 below.

$$M \geq K + 1 - N \quad \text{[Equation 3]}$$

When Equation 3 is summarized for 'K', 'K' may be a value equal to or less than '(N+M)−1'. That is, the number (K) of pulses may be less than (N+M) that is obtained by dividing a total time duration '(N+M)×T' of the first microframe (MF1) by the period 'T'.

Once the number (K) of pulses of the modulated light signal (MLS), the number (N) of cycles of the first section (P1), and the number (M) of cycles of the second section (P2) are determined, a target measurement distance ($D_{max}$) may be determined by Equation 4 below.

$$D_{max} = (N + M - L - 1) \cdot D_{freq} \quad \text{[Equation 4]}$$

In the first microframe (MF1), the first tap may accumulate photocharges captured while the first modulation control signal (MCS1) has a logic high level (H). In addition, in the first microframe (MF1), the second tap may accumulate photocharges captured while the second modulation control signal (MCS2) has a logic high level (H).

In the readout period of the first subframe (SF1), the first tap may output an electrical signal corresponding to the photocharges accumulated in the plurality of first microframes (MF1). A data piece obtained by conversion of the electrical signal output from the first tap may be defined as a first capture data piece (S0) of the first tap. The first capture data piece (S0) of the first tap may include components for the photocharges captured by the first modulation control signal (MCS1) having a modulation phase difference (i.e., in-phase) of 0 degrees with respect to the modulated light signal (MLS).

In the readout period of the first subframe (SF1), the second tap may output an electrical signal corresponding to the photocharges accumulated in the plurality of first microframes (MF1). A data piece obtained by conversion of the electrical signal output from the second tap may be defined as a third capture data piece (S180) of the second tap. The third capture data piece (S180) of the second tap may include components for the photocharges captured by the second modulation control signal (MCS2) having a modulation phase difference of 180 degrees with respect to the modulated light signal (MLS).

Figure 4B:
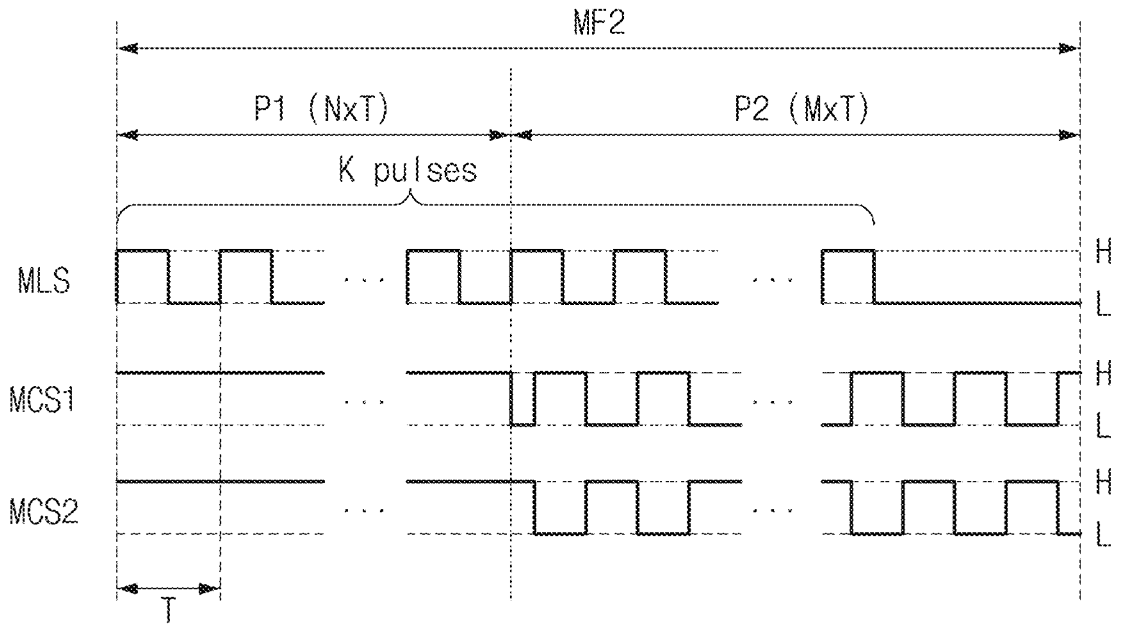
FIG. 4B is a timing diagram illustrating a modulated light signal and modulation control signals for use in a second microframe based on some embodiments of the present disclosure.

FIG. 4B is a timing diagram illustrating a modulated light signal and modulation control signals for use in a second microframe (MF2) based on some embodiments of the present disclosure.

Referring to FIG. 4B, the second microframe (MF2) constituting the exposure period of the second subframe (SF2) shown in FIG. 3 may include a first section P1 and a second section P2.

The modulated light signal (MLS), the first modulation control signal (MCS1), and the second modulation control signal (MCS2) of the second microframe (MF2) of FIG. 4B except for some differences may be substantially the same as the modulated light signal (MLS), the first modulation control signal (MCS1), and the second modulation control signal (MCS2) of the first microframe (MF1) of FIG. 4A, and as such, redundant description thereof will herein be omitted for brevity.

The first modulation control signal (MCS1) of the second microframe (MF2) may have a modulation phase difference of 90 degrees with respect to the modulated light signal (MLS) in the second section P2. In addition, the second modulation control signal (MCS2) of the second microframe (MF2) may have a modulation phase difference of 270 degrees with respect to the modulated light signal (MLS) in the second section P2.

In addition, the number (K) of pulses of the modulated light signal (MLS) in the second microframe (MF2), the number (N) of cycles in the first section (P1) of the second microframe (MF2), the number (M) of cycles in the second section (P2) of the second microframe (MF2), and the target measurement distance ($D_{max}$) in the second microframe (MF2) may be the same as those of the first microframe (MF1).

In the second microframe (MF2), the first tap may accumulate photocharges captured while the first modulation control signal (MCS1) has a logic high level (H). In addition, in the second microframe (MF2), the second tap may accumulate photocharges captured while the second modulation control signal (MCS2) has a logic high level (H).

In the readout period of the second subframe (SF2), the first tap may output an electrical signal corresponding to the photocharges accumulated in the plurality of second microframes (MF2). A data piece obtained by conversion of the electrical signal output from the first tap may be defined as a second capture data piece S90 of the first tap. The second capture data piece S90 of the first tap may include components for photocharges captured by the first modulation control signal (MCS1) having a modulation phase difference of 90 degrees with respect to the modulated light signal (MLS).

In the readout period of the second subframe (SF2), the second tap may output an electrical signal corresponding to the photocharges accumulated in the plurality of second microframes (MF2). A data piece obtained by conversion of the electrical signal output from the second tap may be defined as a fourth capture data piece S270 of the second tap. The fourth capture data piece S270 of the second tap may include components for photocharges captured by the second modulation control signal (MCS2) having a modulation phase difference of 270 degrees with respect to the modulated light signal (MLS).

Figure 4C:
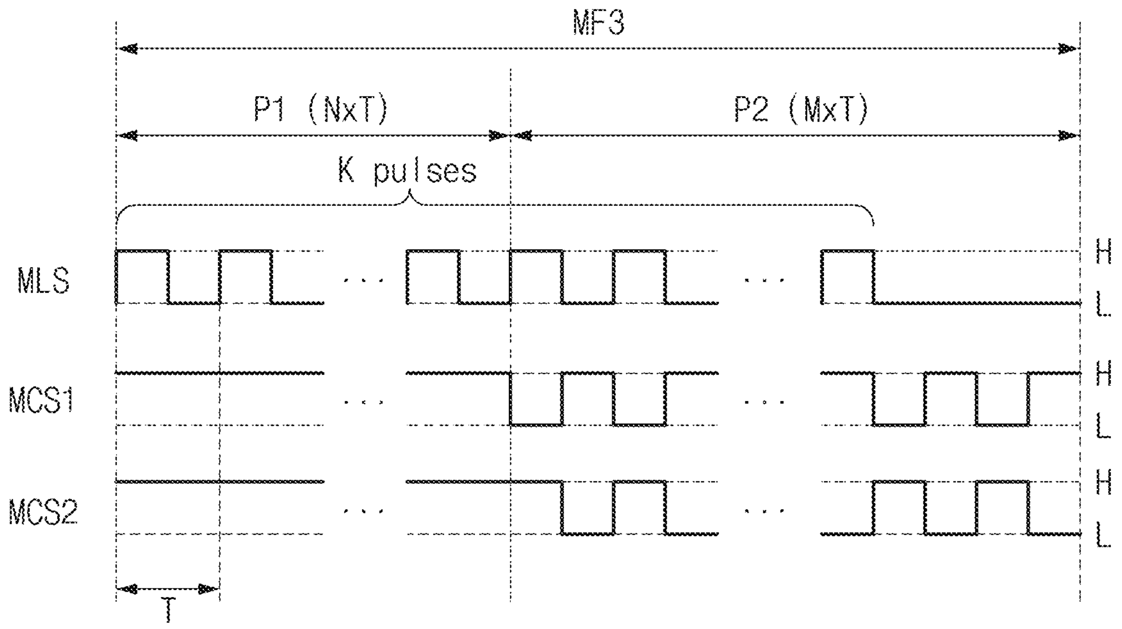
FIG. 4C is a timing diagram illustrating a modulated light signal and modulation control signals for use in a third microframe based on some embodiments of the present disclosure.

FIG. 4C is a timing diagram illustrating a modulated light signal and modulation control signals for use in a third microframe MF3 based on some embodiments of the present disclosure.

Referring to FIG. 4C, the third microframe (MF3) constituting an exposure period of the third subframe SF3 shown in FIG. 3 may include a first section P1 and a second section P2.

The modulated light signal (MLS), the first modulation control signal (MCS1), and the second modulation control signal (MCS2) of the third microframe (MF3) of FIG. 4C except for some differences may be substantially the same as the modulated light signal (MLS), the first modulation control signal (MCS1), and the second modulation control signal (MCS2) of the first microframe (MF1) of FIG. 4A, and as such, redundant description thereof will herein be omitted for brevity.

The first modulation control signal (MCS1) of the third microframe (MF3) may have a modulation phase difference of 180 degrees with respect to the modulated light signal (MLS) in the second section P2. In addition, the second modulation control signal (MCS2) of the third microframe (MF3) may have a modulation phase difference of 0 degrees with respect to the modulated light signal (MLS) in the second section P2.

In addition, the number (K) of pulses of the modulated light signal (MLS) in the third microframe (MF3), the number (N) of cycles in the first section (P1) of the third microframe (MF3), the number (M) of cycles in the second section (P2) of the third microframe (MF3), and the target measurement distance ($D_{max}$) in the third microframe (MF3) may be the same as those of the first microframe (MF1).

In the third microframe (MF3), the first tap may accumulate photocharges captured while the first modulation control signal (MCS1) has a logic high level (H). In addition, in the third microframe (MF3), the second tap may accumulate photocharges captured while the second modulation control signal (MCS2) has a logic high level (H).

In the readout period of the third subframe (SF3), the first tap may output an electrical signal corresponding to the photocharges accumulated in the plurality of third microframes (MF3). A data piece obtained by conversion of the electrical signal output from the first tap may be defined as a third capture data piece S180 of the first tap. The third capture data piece S180 of the first tap may include components for photocharges captured by the first modulation control signal (MCS1) having a modulation phase difference of 180 degrees with respect to the modulated light signal (MLS).

In the readout period of the third subframe (SF3), the second tap may output an electrical signal corresponding to the photocharges accumulated in the plurality of third microframes (MF3). A data piece obtained by conversion of the electrical signal output from the second tap may be defined as a first capture data piece S0 of the second tap. The first capture data piece S0 of the second tap may include components for photocharges captured by the second modulation control signal (MCS2) having a modulation phase difference of 0 degrees with respect to the modulated light signal (MLS).

Figure 4D:
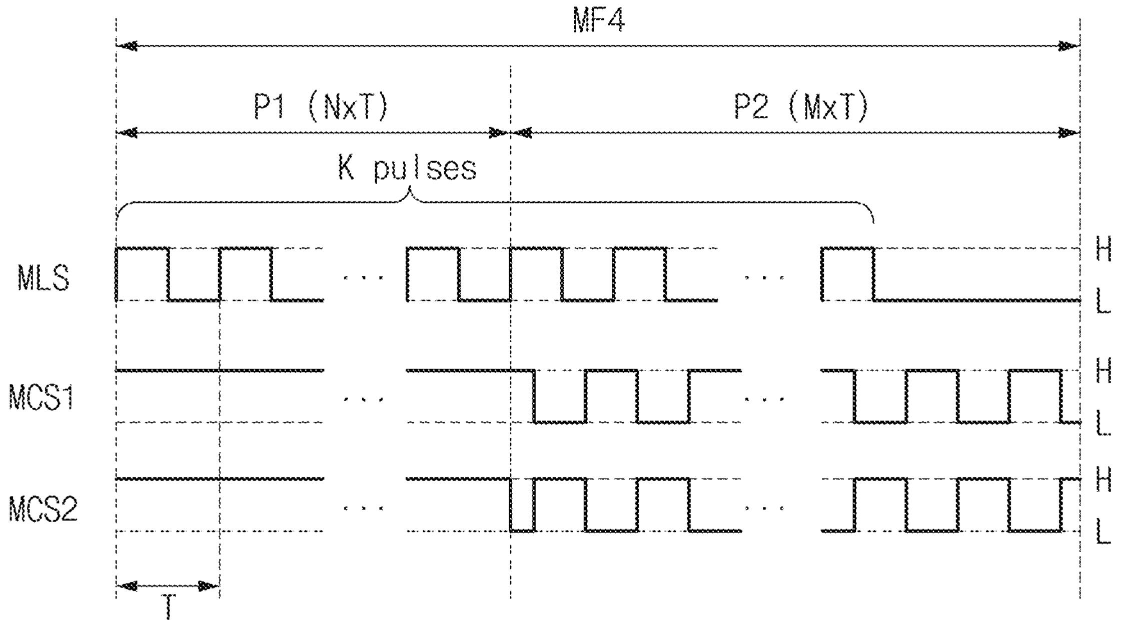
FIG. 4D is a timing diagram illustrating a modulated light signal and modulation control signals for use in a fourth microframe based on some embodiments of the present disclosure.

FIG. 4D is a timing diagram illustrating a modulated light signal and modulation control signals for use in a fourth microframe (MF4) based on some embodiments of the present disclosure.

Referring to FIG. 4D, the fourth microframe (MF4) constituting an exposure period of the fourth subframe (SF4) shown in FIG. 3 may include a first section P1 and a second section P2.

The modulated light signal (MLS), the first modulation control signal (MCS1), and the second modulation control signal (MCS2) of the fourth microframe (MF4) of FIG. 4D except for some differences may be substantially the same as the modulated light signal (MLS), the first modulation control signal (MCS1), and the second modulation control signal (MCS2) of the first microframe (MF1) of FIG. 4A, and as such, redundant description thereof will herein be omitted for brevity.

The first modulation control signal (MCS1) of the fourth microframe (MF4) may have a modulation phase difference of 270 degrees with respect to the modulated light signal (MLS) in the second section P2. In addition, the second modulation control signal (MCS2) of the fourth microframe (MF4) may have a modulation phase difference of 90 degrees with respect to the modulated light signal (MLS) in the second section P2.

In addition, the number (K) of pulses of the modulated light signal (MLS) in the fourth microframe (MF4), the number (N) of cycles in the first section (P1) of the fourth microframe (MF4), the number (M) of cycles in the second section (P2) of the fourth microframe (MF4), and the target measurement distance ($D_{max}$) in the fourth microframe (MF4) may be the same as those of the first microframe (MF1).

In the fourth microframe (MF4), the first tap may accumulate photocharges captured while the first modulation control signal (MCS1) has a logic high level (H). In addition, in the fourth microframe (MF4), the second tap may accumulate photocharges captured while the second modulation control signal (MCS2) has a logic high level (H).

In the readout period of the fourth subframe (SF4), the first tap may output an electrical signal corresponding to the photocharges accumulated in the plurality of fourth microframes (MF4). A data piece obtained by conversion of the electrical signal output from the first tap may be defined as a fourth capture data piece S270 of the first tap. The fourth capture data piece S270 of the first tap may include components for photocharges captured by the first modulation control signal (MCS1) having a modulation phase difference of 270 degrees with respect to the modulated light signal (MLS).

In the readout period of the fourth subframe (SF4), the second tap may output an electrical signal corresponding to the photocharges accumulated in the plurality of fourth microframes (MF4). A data piece obtained by conversion of the electrical signal output from the second tap may be defined as a second capture data piece S90 of the second tap. The second capture data piece S90 of the second tap may include components for photocharges captured by the second modulation control signal (MCS2) having a modulation phase difference of 90 degrees with respect to the modulated light signal (MLS).

As described in FIGS. 4A to 4D, the first to fourth capture data pieces (S0~S270) of each of the first and second taps may be obtained from the first to fourth subframes (SF1~SF4). In order to calculate the distance to the target object 1, the first to fourth capture data pieces (S0~S270) may be required. The first to fourth capture data pieces (S0~S270) may be acquired through the first and second taps in the first and second subframes (SF1, SF2), but the first and second taps may output different signals even under the same operating conditions due to a difference in hardware characteristics between the first tap and the second tap. Therefore, in some embodiments, the first to fourth capture data pieces (S0~S270) may be obtained from each of the first and second taps in units of depth frames through the first to fourth subframes (SF1~SF4), so that it is possible to prevent noise caused by a difference in characteristics between taps from affecting a process of calculating the distance to the target object 1.

The phase difference calculator 210 of the image processing device 200 may sum the first capture data piece S0 of the first tap and the first capture data piece S0 of the second tap to generate the first capture data piece S0 of the corresponding depth frame. In addition, the phase difference calculator 210 may generate the second capture data piece S90 of the corresponding depth frame by summing the second capture data piece S90 of the first tap and the second capture data piece S90 of the second tap. The phase difference calculator 210 may generate the third capture data piece S180 of the corresponding depth frame by summing the third capture data piece S180 of the first tap and the third capture data piece S180 of the second tap. Similarly, the phase difference calculator 210 may sum the fourth capture data piece S270 of the first tap and the fourth capture data piece S270 of the second tap to generate the fourth capture data piece S270 of the corresponding depth frame.

The phase difference calculator 210 may calculate a phase difference (PDIF) between the modulated light signal (MLS) (or the emitted light EL) and the reflected light (RL) based on the first to fourth capture data pieces (S0~S270) of the corresponding depth frame using Equation 5 below.

$$PDIF = \text{Arctan}\left(\frac{S0 - S180}{S90 - S270}\right) \qquad \text{[Equation 5]}$$

In principle, the distance to the target object 1 should be accurately calculated based on the phase difference (PDIF). However, in a situation where the target measurement distance ($D_{max}$) exceeds a maximum measurement distance ($D_{freq}$), even when the target object 1 is located at different distances from the image sensing device, the same phase difference (PDIF) may appear due to periodicity of the modulated light signal (MLS). Therefore, in some embodiments, a method for more accurately calculating the distance to the target object 1 based on a corrected value of the phase difference (PDIF), instead of using the phase difference (PDIF) without change, may be used as needed.

Figure 5:
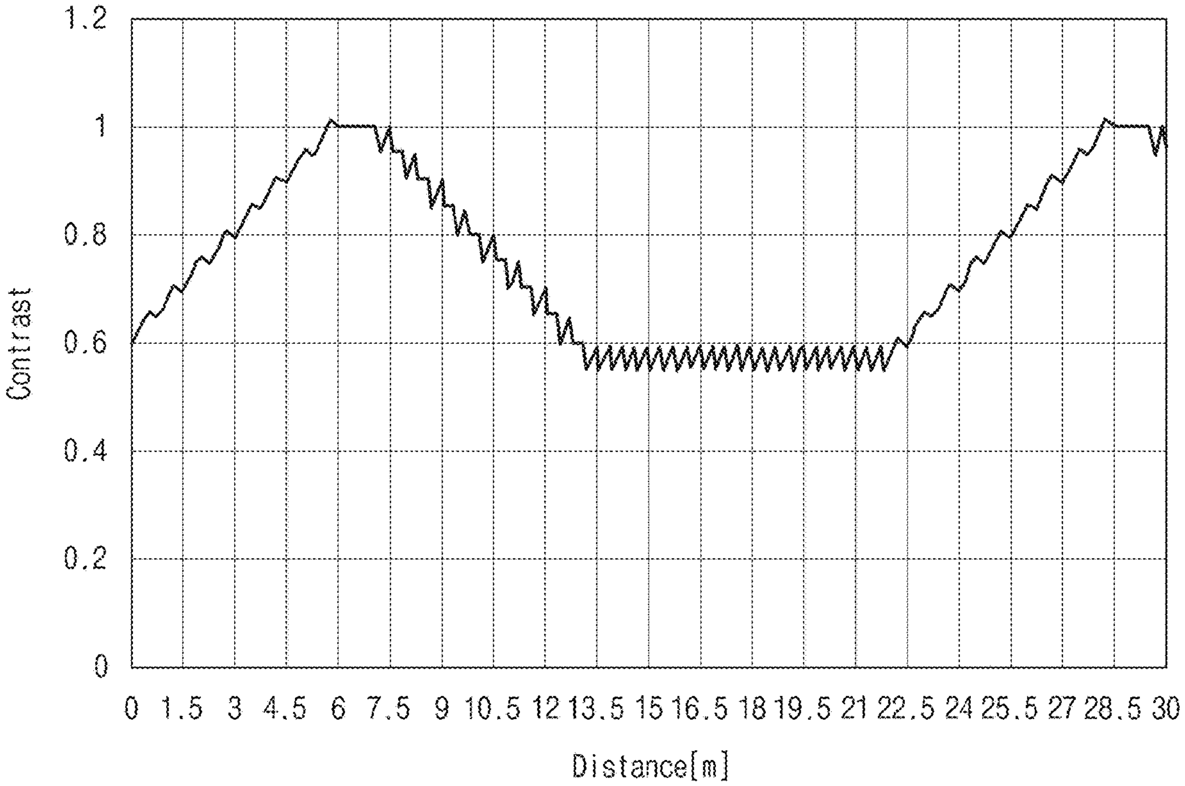
FIG. 5 is a graph illustrating a relationship between a distance to a target object and a contrast of a reflected light based on some embodiments of the present disclosure.

FIG. 5 is a graph illustrating a relationship between the distance to the target object and a contrast of the reflected light (RL) based on some embodiments of the present disclosure.

Referring to FIG. 5, a simulation result of the relationship between the contrast of the reflected light (RL) and the distance to the target object 1 is illustrated. Here, the contrast of the reflected light (RL) may refer to a ratio between the amplitude of the reflected light (RL) and the intensity of the reflected light (RL).

The amplitude of the reflected light (RL) may be calculated by Equation 6 below.

$$\text{Amplitude} = \frac{\sqrt{(S0 - S180)^2 + (S90 - S270)^2}}{2} \qquad \text{[Equation 6]}$$

In addition, the intensity of the reflected light (RL) may be calculated by Equation 7 below.

$$\text{Intensity} = \frac{S0 + S90 + S180 + S270}{4} \qquad \text{[Equation 7]}$$

In Equations 6 and 7, S0, S90, S180, and S270 may refer to the first capture data piece, the second capture data piece, the third capture data piece, and the fourth capture data piece of the corresponding depth frame, respectively.

Accordingly, the contrast of the reflected light RL may be calculated by Equation 8 below.

$$\text{Contrast} = \frac{\text{Amplitude}}{\text{Intensity}} = 2 \cdot \frac{\sqrt{(S0 - S180)^2 + (S90 - S270)^2}}{S0 + S90 + S180 + S270} \qquad \text{[Equation 8]}$$

In Equation 8, it is illustrated that the ratio between the amplitude component and the intensity component is multiplied by a coefficient of 2. However, since the ratio between the amplitude component and the intensity component is important, a coefficient may be set to any value except ‘0’.

The simulation result of FIG. 5 shows a result of a simulation conducted under the condition that a modulation frequency (F) is 100 MHZ, the number (N) of cycles of the first section P1 is 4, the number (K) of pulses of the modulated light signal (MLS) is 10, the number (M) of cycles of the second section P2 is 15, and a target measurement distance ($D_{max}$) is 6 meters (m). In addition, as the modulation frequency (F) is 100 MHZ, the period (T) may be 10 ns, and the maximum measurement distance ($D_{freq}$) may be 1.5 meters (m).

In FIG. 5, as the distance to the target object 1 increases, the contrast of the reflected light (RL) gradually increases up to 6 meters (m), which is the target measurement distance ($D_{max}$), then gradually decreases up to 12 meters (m), remains constant up to 24 meters (m), and then increases again from 24 meters (m).

Figure 6:
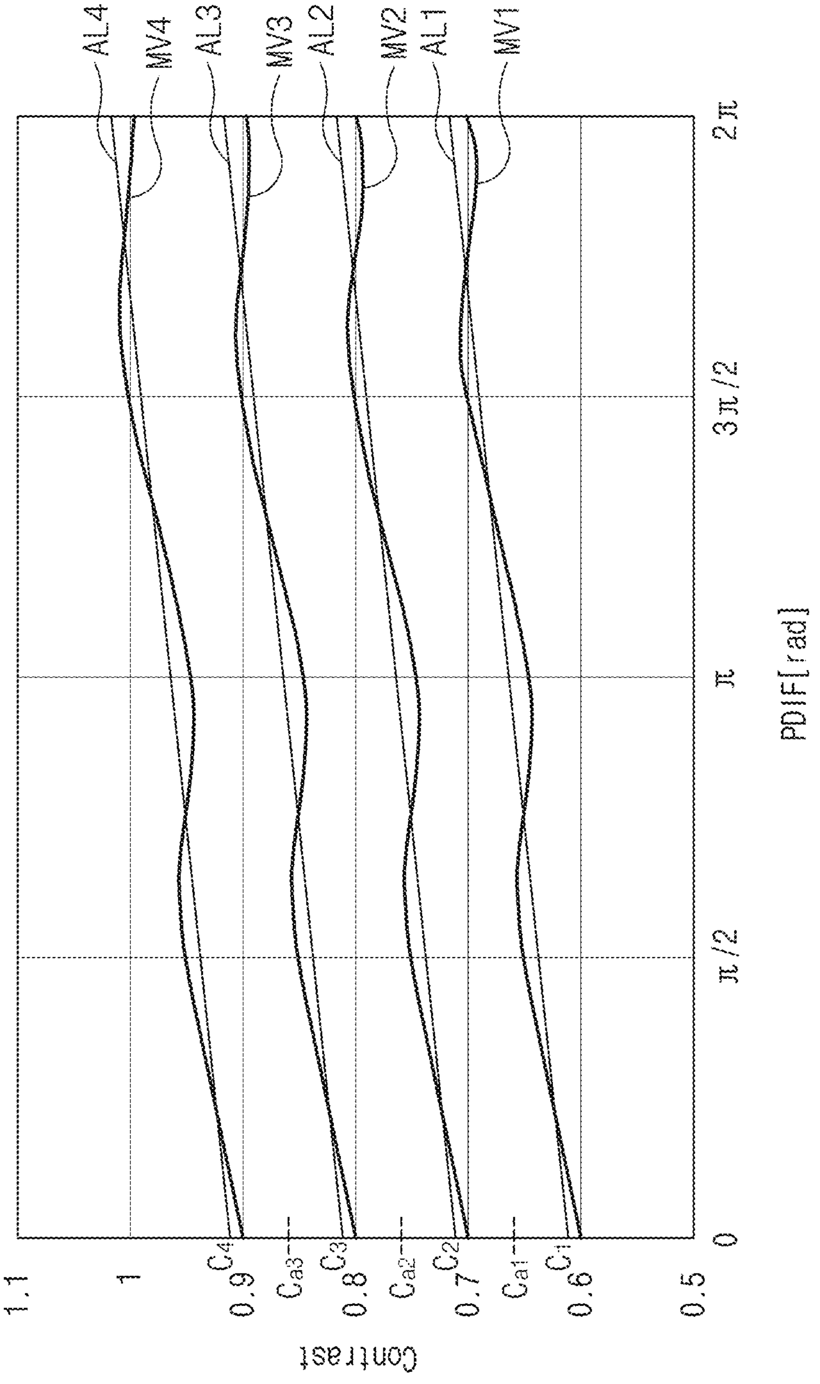
FIG. 6 is a graph illustrating a relationship between a phase difference and a contrast of a reflected light based on some embodiments of the present disclosure.

FIG. 6 is a graph illustrating a relationship between a phase difference and a contrast of the reflected light based on some embodiments of the present disclosure.

Referring to FIG. 6, the relationship between a phase difference (PDIF) and a contrast is illustrated while the distance to the target object 1 increases from 0 m to 6 m, which is the target measurement distance ($D_{max}$).

As the distance to the target object 1 increases from 0 m to 1.5 m, the phase difference (PDIF) may increase from 0 [rad] to 2π[rad], and the contrast may also gradually increase as the phase difference (PDIF) increases. The relationship between the phase difference (PDIF) and the contrast as the distance to the target object 1 increases from 0 m to 1.5 m may be denoted by a first measurement value (MV1). That is, the first measurement value (MV1) may be a set (or aggregate) of points representing the relationship between the phase difference (PDIF) and the contrast as the distance to the target object 1 increases from 0 m to 1.5 m, and may approximate a first straight line (AL1) having a first slope and a first intercept C1. A method of approximating the set of points to a single straight line may be a method of determining a virtual straight line that minimizes the sum of squares of errors of points with respect to the virtual straight line, but the scope of the present disclosure is not limited thereto.

As the distance to the target object 1 increases from 1.5 m to 3 m, the phase difference (PDIF) may increase from 0 [rad] to 2π[rad], and the contrast may also gradually increase as the phase difference (PDIF) increases. The relationship between the phase difference (PDIF) and the contrast as the distance to the target object 1 increases from 1.5 m to 3 m may be denoted by a second measurement value (MV2). That is, the second measured value (MV2) may be a set (or aggregate) of points representing the relationship between the phase difference (PDIF) and the contrast as the distance to the target object 1 increases from 1.5 m to 3 m, and may approximate a second straight line (AL2) having a first slope and a second intercept C2.

As the distance to the target object 1 increases from 3 m to 4.5 m, the phase difference (PDIF) may increase from 0 [rad] to 2π[rad], and the contrast may also gradually increase as the phase difference (PDIF) increases. The relationship between the phase difference (PDIF) and the contrast as the distance to the target object 1 increases from 3 m to 4.5 m may be denoted by a third measurement value (MV3). That is, the third measurement value (MV3) may be a set (or aggregate) of points representing the relationship between the phase difference (PDIF) and the contrast as the distance to the target object 1 increases from 3 m to 4.5 m, and may approximate a third straight line (AL3) having a first slope and a third intercept C3.

As the distance to the target object 1 increases from 4.5 m to 6 m, the phase difference (PDIF) may increase from 0 [rad] to 2π[rad], and the contrast may also gradually increase as the phase difference (PDIF) increases. The relationship between the phase difference (PDIF) and the contrast as the distance to the target object 1 increases from 4.5 m to 6 m may be denoted by a fourth measurement value (MV4). That is, the fourth measurement value (MV4) may be a set (or aggregate) of points representing the relationship between the phase difference (PDIF) and the contrast as the distance to the target object 1 increases from 4.5 m to 6 m, and may approximate a fourth straight line (AL4) having a first slope and a fourth intercept C4.

For example, in a situation where the distance to the target object 1 is set to 0.75 m, 2.25 m, 3.75 m, and 5.25 m, even when the distance to the target object 1 is set to different distances, the phase differences (PDIF) may all appear to be about n [rad]. However, when the distance to the target object 1 is set to 0.75 m, 2.25 m, 3.75 m, and 5.25 m, the contrast may appear differently, so that the phase difference corrector 220 may correct the phase difference (PDIF) using such characteristics.

In some embodiments, the phase difference corrector 220 may correct the phase difference (PDIF) using linear functional characteristics of each of the first to fourth measurement values (MV1~MV4).

The first to fourth straight lines (AL1~AL4) to which the first to fourth measurement values (MV1~MV4) are respectively approximated have the same first slope (A), but may have the first to fourth intercepts (C1~C4) gradually increasing. The first slope (A) may refer to a ratio of the amount of an increase in phase difference (PDIF) to the amount of an increase in contrast, and may be a value determined experimentally in advance.

The phase difference corrector 220 may calculate a measurement intercept (B) corresponding to a current calculated phase difference (PDIF) and a contrast by using a first slope (A) of the first to fourth straight lines (AL1~AL4), as represented by Equation 9 below.

$$B = A \cdot PDIF + \text{contrast} \quad \text{[Equation 9]}$$

The phase difference corrector 220 may calculate an aliasing value (R) corresponding to the measurement intercept (B) by comparing the measurement intercept (B) with the first to third reference intercepts ($C_{a1}$~$C_{a3}$). Here, the first to third reference intercepts ($C_{a1}$~$C_{a3}$) may be calculated using the first to fourth intercepts ($C_1$~$C_4$) as represented by Equation 10 below.

$$C_{a1} = \frac{C_1 + C_2}{2},\ C_{a2} = \frac{C_2 + C_3}{2},\ C_{a3} = \frac{C_3 + C_4}{2} \quad \text{[Equation 10]}$$

Specifically, the phase difference corrector 220 may determine the aliasing value (R) by determining which one of four ranges divided by the first to third reference intercepts ($C_{a1}$~$C_{a3}$) includes the measurement intercept (B). The first to fourth straight lines (AL1~AL4) may correspond to the first to fourth aliasing cycles, respectively. The contrast may also increase as the phase difference (PDIF) increases in each of the first to fourth aliasing cycles. The contrast corresponding to the phase difference (PDIF) may vary in each of the first to fourth aliasing cycles. The aliasing value (R) may indicate which one of the first to fourth aliasing cycles includes an aliasing cycle corresponding to the phase difference (PDIF).

In the first aliasing cycle, as the distance to the target object 1 increases from 0 m to 1.5 m, the phase difference (PDIF) may increase from 0 to 2π. In the second aliasing cycle, the phase difference (PDIF) may increase from 0 to 2π as the distance to the target object 1 increases from 1.5 m to 3 m. In the third aliasing cycle, the phase difference (PDIF) may increase from 0 to 2π as the distance to the target object 1 increases from 3 m to 4.5 m. In the fourth aliasing cycle, the phase difference (PDIF) may increase from 0 to 2π as the distance to the target object 1 increases from 4.5 m to 6 m. That is, the distance to the target object 1 indicated by the phase difference (PDIF) may vary depending on which one of the first to fourth aliasing cycles includes an aliasing cycle corresponding to the phase difference (PDIF).

The aliasing value (R) may be determined by comparing the measurement intercept (B) and the first to third reference intercepts ($C_{a1}$~$C_{a3}$), as represented by Equation 11 below.

$$R = 1\ (B < C_{a1}) \quad \text{[Equation 11]}$$

$$R = 2\ (C_{a1} \leq B < C_{a2})$$

$$R = 3\ (C_{a2} \leq B < C_{a3})$$

$$R = 4\ (C_{a3} \leq B)$$

The aliasing value (R) may refer to a value indicating which one of the first to fourth straight lines (AL1~AL4) corresponds to the measurement intercept (B) corresponding to the current calculated phase difference (PDIF) and the contrast, and may indicate which one of the first to fourth aliasing cycles is an aliasing cycle corresponding to the phase difference (PDIF). For example, if the aliasing value R is set to '1', the measurement intercept (B) corresponds to the first straight line (AL1) and the aliasing cycle corresponding to the phase difference (PDIF) may be a first aliasing cycle.

The phase difference corrector 220 may calculate the corrected phase difference (PDIF) by correcting the phase difference (PDIF) using the aliasing value (R), as represented by Equation 12.

$$PDIF' = PDIF + (R-1)\cdot 2\pi \quad \text{[Equation 12]}$$

As the aliasing value (R) increases by 1, the phase difference corrector 220 may calculate the corrected phase difference (PDIF) by increasing the phase difference (PDIF) by 2π. In other words, (R−1)·2π may be defined as a phase correction value depending on the aliasing value (R), and the corrected phase difference (PDIF) may be a value obtained by summing the phase correction value and the phase difference (PDIF).

That is, the phase difference corrector 220 may calculate a measurement intercept (B) corresponding to the current calculated phase difference (PDIF) and the contrast, may determine the aliasing value (R) corresponding to the measurement intercept (B), and may calculate a corrected phase difference (PDIF) by correcting the phase difference (PDIF) using the aliasing value (R).

The distance calculator 230 may calculate a distance (Dr) to the target object 1 using the corrected phase difference (PDIF), as represented by Equation 13 below.

$$D_r = \frac{PDIF'}{2\pi} \cdot D_{freq} \quad \text{[Equation 13]}$$

In some embodiments, despite an aliasing phenomenon that is a limit of the indirect TOF method, an aliasing cycle corresponding to the calculated phase difference (PDIF) may be determined based on the contrast to correct the phase difference (PDIF), so that the distance to the target object 1 can be accurately measured within a target measurement distance ($D_{max}$) exceeding a maximum measurement distance ($D_{freq}$) according to a modulation frequency (F).

The principle that makes the above-described method possible is that the contrast can represent the aliasing cycle. In the first section P1 of the microframe (e.g., MF1), as the first and second modulation control signals (MCS1, MCS2) have a logic high level (H) together, the intensity component of the reflected light (RL) may be mainly obtained. In the second section P2 of the microframe (e.g., MF1), as the first and second modulation control signals (MCS1, MCS2) have a predetermined modulation phase difference with the emitted light (EL), the first and second modulation control signals (MCS1, MCS2) alternately have a logic high level (H), so that the amplitude component of the reflected light (RL) can be mainly obtained. Accordingly, as a phase difference between the emitted light (EL) and the reflected light (RL) increases, the amplitude component of the reflected light (RL) may become relatively stronger compared to the intensity component of the reflected light (RL), so that the contrast may indicate an aliasing cycle.

Moreover, the first slope (A) and the first to third reference intercepts ($C_{a1}$~$C_{a3}$) are values that depend on characteristics (e.g., N, M, L, etc.) of the image sensing device 100, and the phase difference corrector 220 may receive the first slope (A) and the first to third reference intercepts ($C_{a1}$~$C_{a3}$) from the image sensing device 100 or an external device (e.g., a test device) and store the received first slope (A) and reference intercepts ($C_{a1}$~$C_{a3}$) in advance.

To describe the operation of the image processing device 200 as a whole, the phase difference calculator 210 may calculate a phase difference (PDIF) between the modulated light signal (MLS) and the reflected light (RL) based on a plurality of capture data pieces (e.g., S0, S90, S180, and S270) generated by a plurality of modulation control signals (e.g., MCS1 and MCS2) each having a predetermined modulation phase difference with the modulated light signal (MLS).

The phase difference corrector 220 may calculate the contrast, which is a ratio of the amplitude component of the reflected light (RL) to the intensity component of the reflected light (RL), using a plurality of capture data pieces (e.g., S0, S90, S180, and S270), and may calculate the aliasing value (R) corresponding to the calculated contrast.

In addition, the distance calculator 230 may accurately calculate the distance to the target object 1 using the corrected phase difference (PDIF) obtained by correcting the phase difference (PDIF) according to the aliasing value (R).

Figure 7:
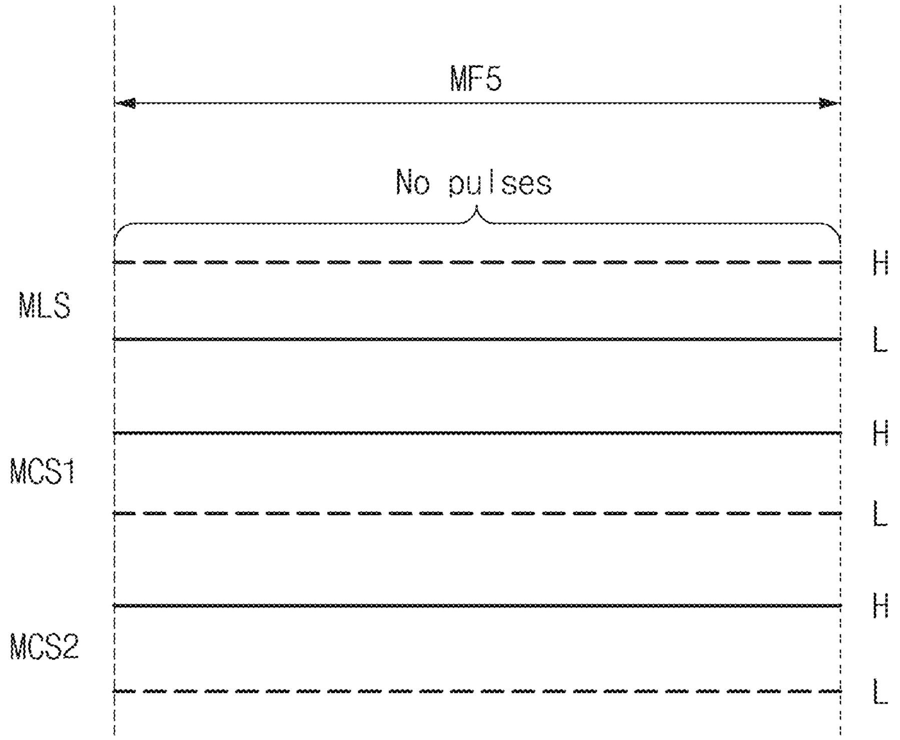
FIG. 7 is a timing diagram illustrating a method for removing components caused by ambient light from the intensity of a reflected light based on some embodiments of the present disclosure.

FIG. 7 is a timing diagram illustrating a method for removing components caused by ambient light from the intensity of the reflected light (RL) based on some embodiments of the present disclosure.

Referring to FIG. 7, to accurately determine the aliasing cycle based on the contrast according to the above-described method, as the distance to the target object 1 increases, the intensity component of the reflected light (RL) sufficiently decreases so that the contrast should significantly increase. However, when the intensity component of the reflected light RL includes an excessively large amount of ambient light components (hereinafter referred to as 'ambient light component'), a change in contrast is not sufficient despite a change in the distance to the target object 1, so that it may become difficult to distinguish the aliasing cycles from each other.

In addition, if the ambient light component fluctuates significantly, the amplitude component of the contrast is not affected, but the intensity component of the contrast may be greatly affected, depending on the degree of such fluctuation. In order to accurately measure the distance to the target object 1, the contrast must change only depending on the distance to the target object 1. However, the contrast may change depending on the change in the ambient light component, so that the distance to the target object 1 may not be accurately measured.

FIG. 7 is a timing diagram illustrating a method for acquiring ambient light components based on some embodiments of the present disclosure.

The depth frame shown in FIG. 7 may further include a fifth subframe, unlike the depth frame of FIG. 3. The fifth subframe may include an exposure period and a readout period in the same manner as the first to fourth subframes (SF1~SF4) of FIG. 3. The basic operations in the exposure period and the readout period of FIG. 7 except for some differences are identical to those of FIG. 3, and as such redundant description thereof will herein be omitted for brevity, such that the operations of FIG. 7 will hereinafter be described centering upon characteristics different from those of FIG. 3.

The exposure period of the fifth subframe may include one fifth microframe (MF5). As the modulated light signal (MLS) maintains the logic low level L in the fifth microframe (MF5), the emitted light (EL) and the reflected light (RL) may not occur. In addition, as each of the first modulation control signal (MCS1) and the second modulation control signal (MCS2) in the fifth microframe (MF5) has a logic high level, ambient light components can be captured in the first and second taps. Image data corresponding to ambient light components captured in the first and second taps may be defined as sub ambient light data ($AMB_{sub}$). When the length of the exposure period of the fifth subframe is defined as an ambient exposure time ($T_{amb}$), and the length of the exposure period of each of the first to fourth subframes (SF1~SF4) is defined as a reference exposure time ($T_{depth}$), the phase difference corrector 220 may calculate ambient light data (AMB) using Equation 14 below.

$$AMB = \frac{T_{depth}}{T_{amb}} \cdot AMB_{sub} \quad \text{[Equation 14]}$$

In the fifth microframe MF5, the first tap and the second tap may capture ambient light components without using the reflected light (RL), and an ambient exposure time ($T_{amb}$) of the fifth microframe MF5 (or fifth subframe) is not necessarily the same as a reference exposure time ($T_{depth}$) of each of the first to fourth subframes (SF1~SF4) and may be shorter than the reference exposure time ($T_{depth}$). Even if the ambient exposure time ($T_{amb}$) is shorter than the reference exposure time ($T_{depth}$), the phase difference corrector 220 may multiply the sub-ambient light data ($AMB_{sub}$) by the ratio of the ambient exposure time ($T_{amb}$) to the reference exposure time ($T_{depth}$), so that the ambient light data (AMB) can be calculated. That is, degradation of the frame rate of the depth frame can be minimized by reducing the time duration required for the fifth microframe (MF) as much as possible.

The phase difference corrector 220 may remove ambient light components from the intensity of the reflected light (RL) using ambient light data (AMB), as represented by Equation 15 below.

$$\text{Intensity} = \frac{S0 + S90 + S180 + S270 - AMB}{4} \quad \text{[Equation 15]}$$

The phase difference corrector 220 may calculate a contrast using the intensity of the reflected light (RL) from which the ambient light components have been removed. Accordingly, the contrast can be changed depending on the distance to the target object 1 regardless of the ambient light components, and the distance to the target object 1 can be accurately measured.

Figure 8A:
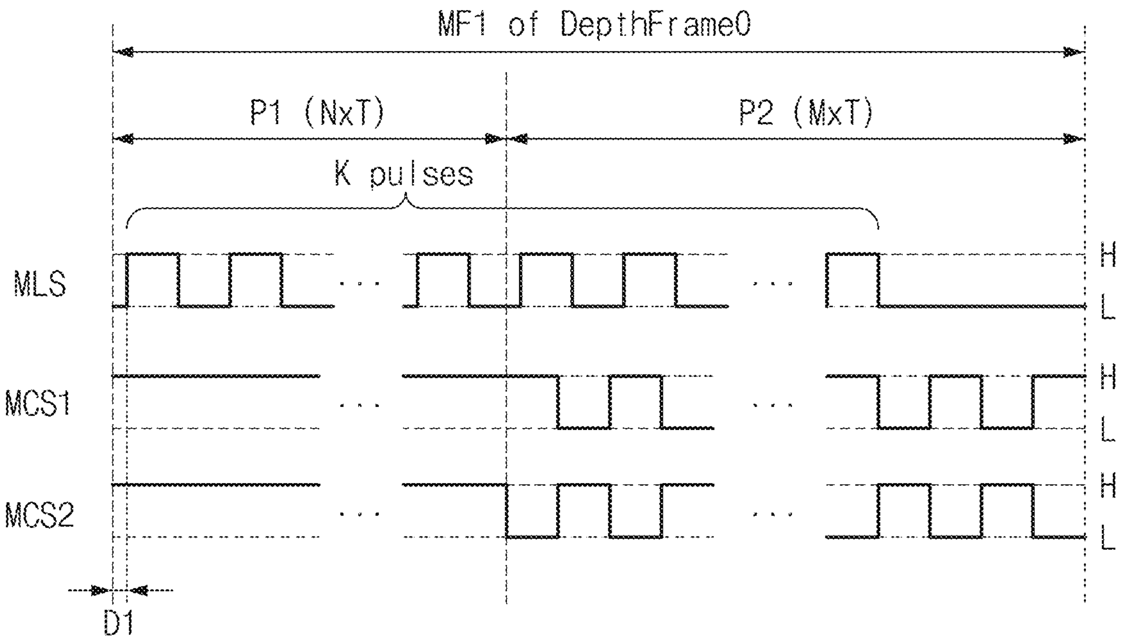
FIGS. 8A to 9 are timing diagrams illustrating another method for removing components caused by ambient light from the intensity of a reflected light based on some embodiments of the present disclosure.
Figure 8B:
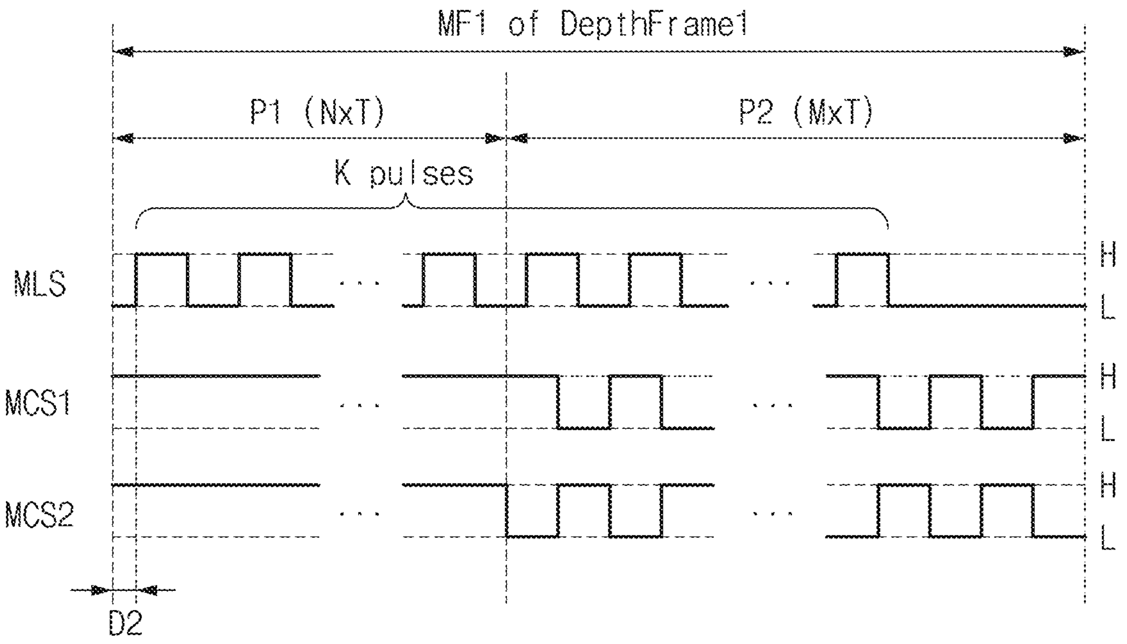
Figure 8C:
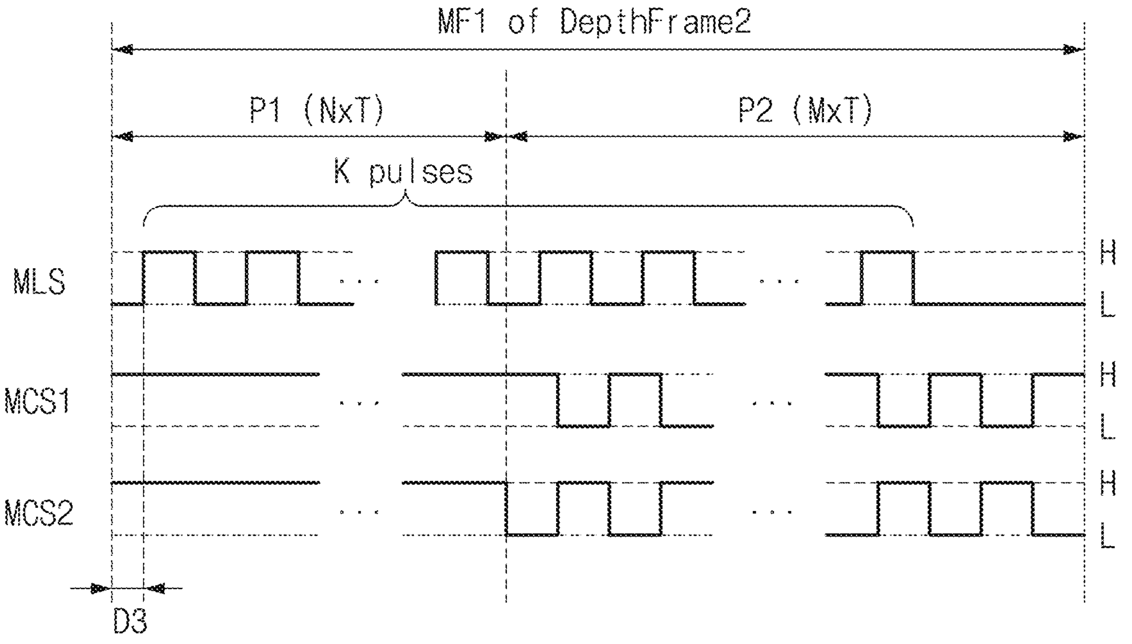
Figure 8D:
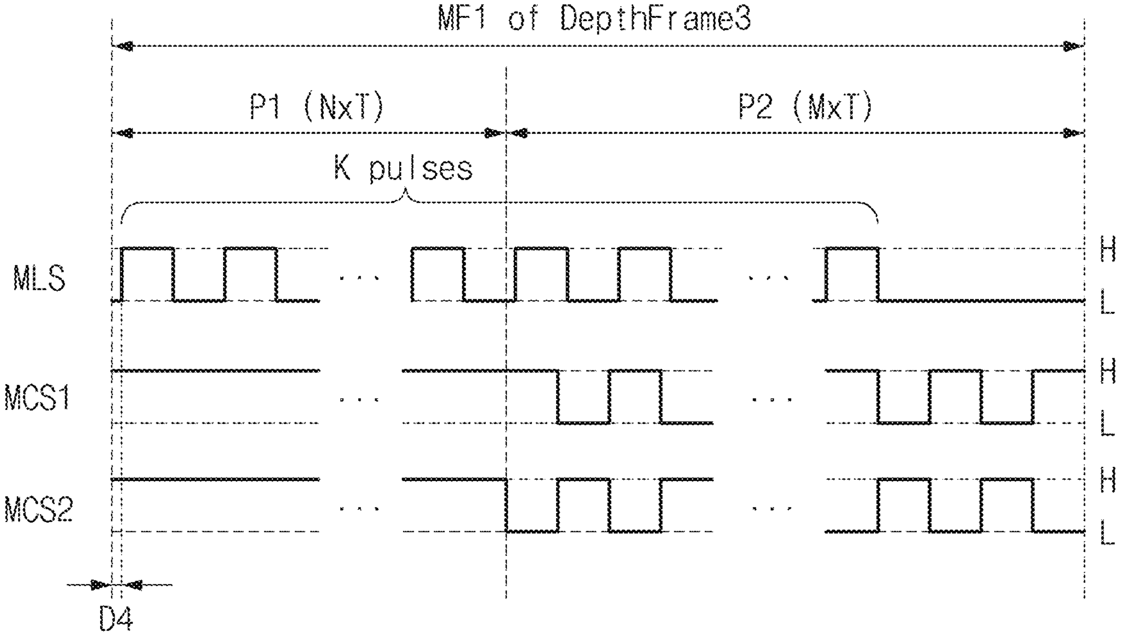
Figure 9:
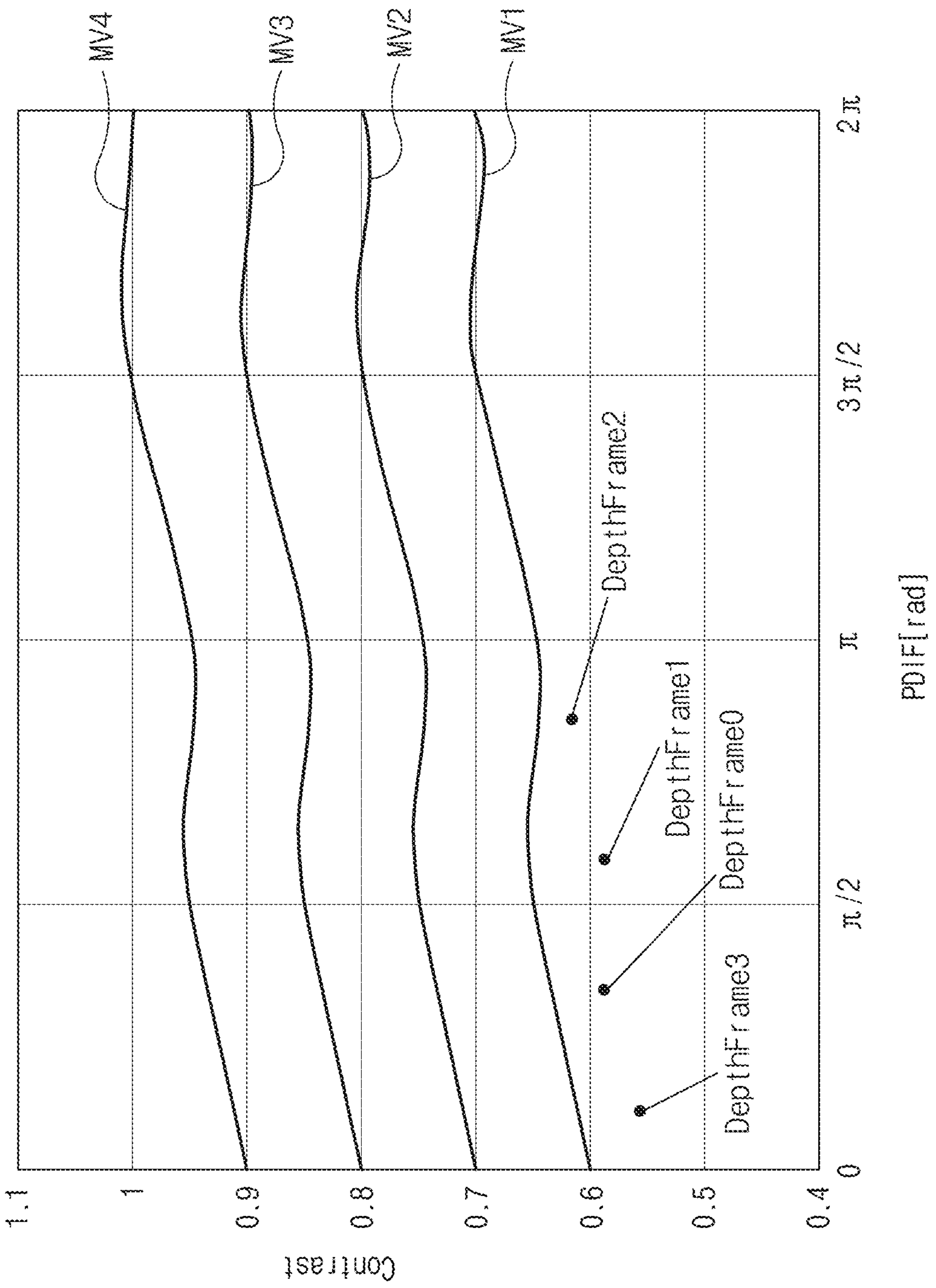

FIGS. 8A to 9 are timing diagrams illustrating another method for removing components caused by ambient light from the intensity of the reflected light based on some embodiments of the present disclosure.

Another embodiment of removing the ambient light components from the intensity of the reflected light (RL) will hereinafter be described with reference to FIGS. 8A to 9. The depth frames (DepthFrame0~DepthFrame3) according to another embodiment of FIGS. 8A to 8D may include waveforms of the modulated light signal (MLS), a timing point of which is adjusted, unlike the depth frame of FIG. 3. Each of the depth frames (DepthFrame0~DepthFrame3) may include an exposure period and a readout period in the same manner as the depth frame of FIG. 3, and the basic operations in the exposure period and readout period shown in FIGS. 8A to 9 except for some differences are identical to those of FIG. 3, and as such redundant description thereof will herein be omitted for brevity, such that the operations of FIGS. 8A to 9 will hereinafter be described centering upon characteristics different from those of FIG. 3.

The first to fourth depth frames (DepthFrame0~DepthFrame3) may be arranged consecutive to each other. In each of the first to fourth depth frames (DepthFrame0~DepthFrame3), the modulated light signal (MLS) generated in a microframe (e.g., MF1) of at least one subframe (e.g., SF1) may be generated to have a predetermined time delay from a start time of the microframe. Hereinafter, the first microframe (MF1) included in each of the first to fourth depth frames (DepthFrame0~DepthFrame3) will be described as an example, but the same description may also be applied to other microframes (MF2~MF4) as necessary.

In FIG. 8A, the pulse of the modulated light signal (MLS) generated in the first microframe (MF1) of the first depth frame (DepthFrame0) may be delayed by a first delay time amount (D1) from the start time point of the first microframe (MF1).

In FIG. 8B, the pulse of the modulated light signal (MLS) generated in the first microframe (MF1) of the second depth frame (DepthFrame1) may be delayed by a second delay time amount (D2) from the start time point of the first microframe (MF1).

In FIG. 8C, the pulse of the modulated light signal (MLS) generated in the first microframe (MF1) of the third depth frame (DepthFrame2) may be delayed by a third delay time amount (D3) from the start time point of the first microframe (MF1).

In FIG. 8D, the pulse of the modulated light signal (MLS) generated in the first microframe (MF1) of the fourth depth frame (DepthFrame3) may be delayed by a fourth delay time amount (D4) from the start time point of the first microframe (MF1).

In each of the first to fourth depth frames (DepthFrame0~DepthFrame3), the modulated light signal (MLS) may include pulses that are intentionally delayed.

The first to fourth delay time amounts (D1~D4) may be different from each other, and each of the first to fourth delay time amounts (D1~D4) may be set to a value of less than or equal to a time duration (e.g., period/2) corresponding to a predetermined phase (e.g., n), but the scope of the present disclosure is not limited thereto.

In FIG. 9, the phase difference (PDIF) and the contrast obtained from each of the first to fourth depth frames (DepthFrame0~DepthFrame3) are displayed in a graph showing the relationship between the phase difference (PDIF) and the contrast of the reflected light (RL). The contrast corresponding to each of the first to fourth depth frames (DepthFrame0~DepthFrame3) may be plotted at a position deviating from the first measurement value (MV1). This is because the contrast changes depending on the ambient light components, and the phase difference corrector 220 may calculate a slope ($A_{amb}$) of an approximate straight line that approximates four coordinates of the phase difference (PDIF) and the contrast obtained from the first to fourth depth frames (DepthFrame0~DepthFrame3).

The phase difference corrector 220 may calculate the intensity component (Intensity) of the reflected light (RL) obtained when the ambient light components are removed from the intensity component ($Intensity_{amb}$) of the reflected light (RL) obtained from the fourth depth frame (DepthFrame3), as represented by Equation 16 below. That is, the phase difference corrector 220 may use information obtained from three depth frames (DepthFrame0~DepthFrame2) preceding the fourth depth frame (DepthFrame3) to correct the intensity component of the reflected light (RL) obtained from the fourth depth frame (DepthFrame3). As a result, degradation of unnecessary frame rates that may occur due to correction of the intensity component ($Intensity_{amb}$) of the reflected light (RL) can be prevented, and correction of the intensity component ($Intensity_{amb}$) of the reflected light (RL) can be performed for each depth frame.

$$\text{Intensity} = \frac{A_{amb}}{A}\text{Intensity}_{amb} \quad \text{[Equation 16]}$$

In Equation 16, 'A' may refer to a first slope of each of the first to fourth straight lines (AL1~AL4) to which the first to fourth measurement values (MV1~MV4) are respectively approximated.

The phase difference corrector 220 may calculate the contrast using the intensity component (Intensity) of the reflected light (RL) from which the ambient light components have been removed. Accordingly, the contrast may be changed depending on the distance to the target object 1 regardless of the ambient light components, and the distance to the target object 1 can be accurately measured.

In addition, since the pulse of the modulated light signal (MLS) was intentionally delayed by the corresponding delay time amount (D1~D4) in each depth frame (DepthFrame0~DepthFrame3), the distance calculator 230 may compensate for (for example, add or subtract) a distance corresponding to each delay time amount (D1~D4) corresponding to each depth frame (DepthFrame0~DepthFrame3) in the process of calculating the distance to the target object 1.

In the examples of FIGS. 8A to 9, the slope ($A_{amb}$) may be calculated using approximate straight lines formed by approximation of the four coordinates of the phase differences (PDIF) and the contrasts respectively obtained from four depth frames for one pixel. However, the slope ($A_{amb}$) of a more accurate approximate straight line can be obtained using the slope obtained by averaging the slopes calculated for a plurality of pixels.

According to another embodiment, calculation of the slope ratio ($A_{amb}$/A) for correction of the intensity component (Intensity amb) of the reflected light (RL) may not be performed in all depth frames, but may be performed periodically in some depth frames according to a predetermined period. Here, in a depth frame in which calculation of the slope ratio ($A_{amb}$/A) is not performed, correction of the intensity component ($Intensity_{amb}$) of the reflected light (RL) can be performed using the slope ratio ($A_{amb}$/A) calculated in a previous depth frame.

According to still another embodiment, calculation of the slope ratio ($A_{amb}$/A) for correction of the intensity component ($Intensity_{amb}$) of the reflected light (RL) may be performed when specific conditions (e.g., a condition indicating that a change in an illuminance value measured by the illuminance sensor (not shown) is a threshold value or greater, or a condition indicating that a change in a total sum (or average) of the intensity components of all pixels is a threshold value or greater, are satisfied. Here, in a depth frame in which calculation of the slope ratio ($A_{amb}$/A) is not performed, correction of the intensity component ($Intensity_{amb}$) of the reflected light (RL) can be performed using the slope ratio ($A_{amb}$/A) calculated in a previous depth frame.

The number of subframes per depth frame, the order of the first section P1 and the second section P2 in each microframe, the order of the microframes, etc. described in the present disclosure are merely examples, and other embodiments are also possible.

Figure 10:
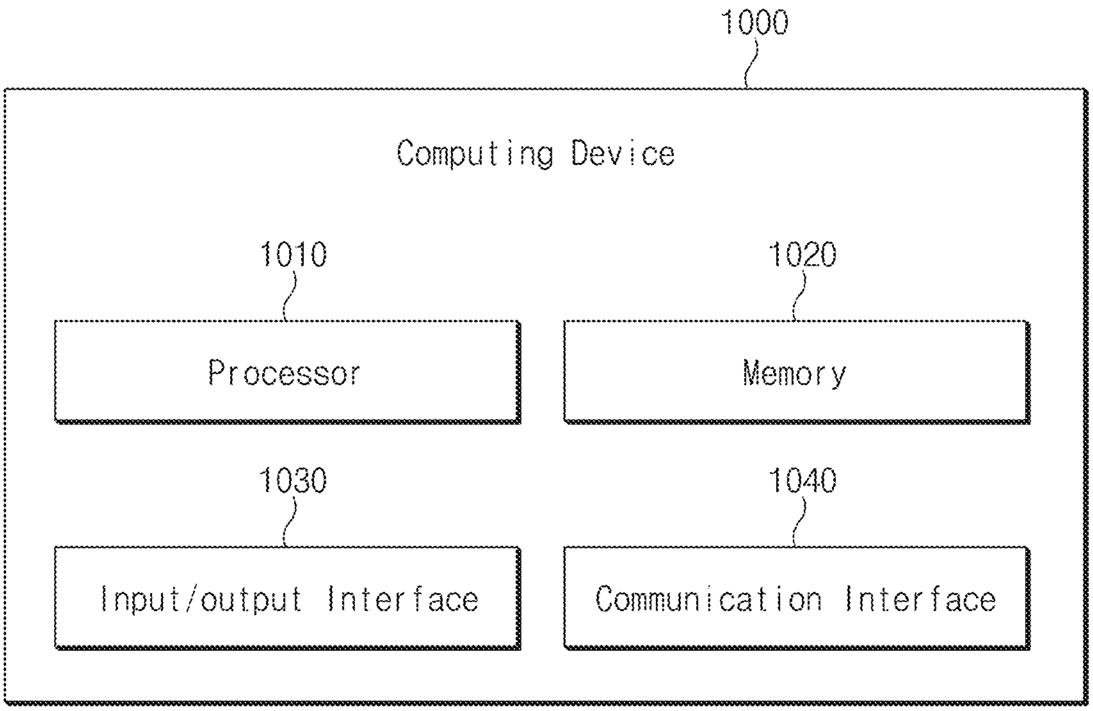
FIG. 10 is a block diagram showing a computing device 1000 corresponding to the image processing device of FIG. 1 based on some embodiments of the present disclosure.

FIG. 10 is a block diagram showing a computing device 1000 corresponding to the image processing device of FIG. 1.

Referring to FIG. 10, the computing device 1000 may represent an embodiment of a hardware configuration for performing the operation of the image processing device 200 of FIG. 1.

The computing device 1000 may be mounted on a chip that is independent from the chip on which the image sensing device 100 is mounted. According to one embodiment, the chip on which the image sensing device 100 is mounted and the chip on which the computing device 1000 is mounted may be implemented in one package, for example, a multi-chip package (MCP), but the scope of the disclosed technology is not limited thereto.

Additionally, the internal configuration or arrangement of the image sensing device 100 and the image processing device 200 described in FIG. 1 may vary depending on the embodiment. For example, at least a portion of the image sensing device may be included in the image processing device 200. Alternatively, at least a portion of the computing device 1000 may be included in the image sensing device. In this case, at least a portion of the computing device 1000 may be mounted together on a chip on which the image sensing device 100 is mounted.

The computing device 1000 may include a processor 1010, a memory 1020, an input/output interface 1030, and a communication interface 1040.

The processor 1010 may process data and/or instructions required to perform the operations of the components (210~230) of the image processing device 200 described in FIG. 1. That is, the processor 1010 may refer to the image processing device 200, but the scope of the present disclosure is not limited thereto.

The memory 1020 may store data and/or instructions required to perform operations of the components (210~230) of the image processing device 200, and may be accessed by the processor 1010. For example, the memory 1020 may be volatile memory (e.g., Dynamic Random Access Memory (DRAM), Static Random Access Memory (SRAM), etc.) or non-volatile memory (e.g., Programmable Read Only Memory (PROM), Erasable PROM (EPROM), etc.), EEPROM (Electrically Erasable PROM), flash memory, etc.).

That is, the computer program for performing the operations of the image processing device 200 disclosed in the present disclosure is recorded in the memory 1020 and executed and processed by the processor 1010, thereby implementing the operations of the image processing device 200.

The input/output interface 1030 is an interface that connects an external input device (e.g., keyboard, mouse, touch panel, etc.) and/or an external output device (e.g., display) to the processor 1010 to allow data to be transmitted and received.

The communication interface 1040 is a component that can transmit and receive various data with an external device (e.g., an application processor, external memory, etc.), and may be a device that supports wired or wireless communication.

As is apparent from the above description, the image sensing device based on some embodiments of the present disclosure can more accurately obtain the distance to a target object to be captured by correcting a phase difference calculated by the time of flight (ToF) method.

The embodiments of the present disclosure may provide a variety of effects capable of being directly or indirectly recognized.

Although a number of illustrative embodiments have been described, it should be understood that modifications and enhancements to the disclosed embodiments and other embodiments can be devised based on what is described and/or illustrated in the present disclosure.

What is claimed is:

1. An image processing device comprising:
- a phase difference calculator configured to calculate a phase difference between a modulated light signal and a reflected light based on a plurality of capture data pieces generated by a plurality of modulation control signals each having a predetermined modulation phase difference with respect to the modulated light signal;
- a phase difference corrector configured to calculate a contrast, which is a ratio of an amplitude component of the reflected light to an intensity component of the reflected light, using the plurality of capture data pieces, and configured to determine an aliasing value corresponding to the contrast; and
- a distance calculator configured to calculate a distance to a target object using a corrected phase difference obtained by correcting the phase difference according to the aliasing value.

2. The image processing device according to claim 1, wherein the predetermined modulation phase difference is one of 0, 90, 180 and 270 degrees.

3. The image processing device according to claim 1, wherein:
- the plurality of capture data pieces are generated in units of depth frames, and
- each of the depth frames includes a plurality of subframes.

4. The image processing device according to claim 3, wherein each of the plurality of subframes includes:
- an exposure period, in which photocharges are generated when the reflected light is sensed by the plurality of modulation control signals and the generated photocharges are accumulated, and
- a readout period, in which the capture data piece corresponding to the accumulated photocharges is generated.

5. The image processing device according to claim 4, wherein:
- the exposure period includes a plurality of microframes, and
- each of the plurality of microframes includes:
  - a first section, in which the plurality of modulation control signals maintain a logic high level, and
  - a second section, in which the plurality of modulation control signals alternately have a logic high level.

6. The image processing device according to claim 5, wherein the plurality of modulation control signals have opposite phases to each other in the second section.

7. The image processing device according to claim 5, wherein a number of pulses of the modulated light signal in each of the plurality of microframes is less than a value obtained by dividing a time duration of the microframe by a pulse period.

8. The image processing device according to claim 4, wherein the exposure period includes a microframe, in which the modulated light signal maintains a logic low level and each of the plurality of modulation control signals maintains a logic high level.

9. The image processing device according to claim 8, wherein the phase difference corrector is further configured to remove an ambient light component from the intensity component using ambient light data obtained from the microframe.

10. The image processing device according to claim 5,
- wherein a pulse of the modulated light signal is delayed by a predetermined delay time amount from a start time point of each of the plurality of microframes, and
- wherein the delayed pulse is generated in each of the plurality of microframes.

11. The image processing device according to claim 10, wherein the phase difference corrector is further configured to correct the intensity component based on a slope of an approximate straight line obtained by approximating coordinates of the phase differences and the contrasts obtained from a current depth frame and at least one depth frame preceding the current depth frame.

12. The image processing device according to claim 1,
- wherein the phase difference corrector is further configured to calculate a measurement intercept based on a first slope, which indicates a ratio of an increase amount of the phase difference to an increase amount of the contrast, the contrast and the phase difference, and
- wherein the phase difference corrector determines the aliasing value by comparing the measurement intercept with a plurality of reference intercepts.

13. The image processing device according to claim 12, wherein the plurality of reference intercepts are determined by an intercept of a straight line corresponding to the aliasing value.

14. The image processing device according to claim 1, wherein the corrected phase difference is a value obtained by adding a phase correction value, which depends on the aliasing value, to the phase difference.

15. An imaging device comprising:
- an image sensing device configured to generate a plurality of capture data pieces using a plurality of modulation control signals each having a predetermined modulation phase difference with respect to a modulated light signal; and an image processing device configured to calculate a contrast, which is a ratio of an amplitude component of a reflected light to an intensity component of the reflected light, using the plurality of capture data pieces, and configured to calculate a distance to a target object using a corrected phase difference obtained by correcting a phase difference between the modulated light signal and the reflected light according to an aliasing value corresponding to the contrast.

16. The imaging device according to claim 15, wherein:

the plurality of capture data pieces is generated in units of depth frames, each of the depth frames includes a plurality of subframes, and each of the plurality of subframes includes:

an exposure period, in which photocharges are generated when the reflected light is sensed by the plurality of modulation control signals and the generated photocharges are accumulated, and a readout period, in which the capture data pieces corresponding to the accumulated photocharges are generated.

17. The imaging device according to claim 16, wherein:

the exposure period includes a plurality of microframes, and each of the plurality of microframes includes:

a first section, in which the plurality of modulation control signals maintain a logic high level, and a second section, in which the plurality of modulation control signals alternately have a logic high level.

18. The imaging device according to claim 17, wherein a number of pulses of the modulated light signal in each of the plurality of microframes is less than a value obtained by dividing a time duration of the microframe by a pulse period.

19. The imaging device according to claim 15, wherein the image processing device is further configured to:

calculate a measurement intercept based on a first slope, which indicates a ratio of an increase amount of the phase difference to an increase amount of the contrast, the contrast and the phase difference; and determine the aliasing value by comparing the measurement intercept with a plurality of reference intercepts.

* * * * *